United States Patent
Siomina et al.

(10) Patent No.: US 9,462,520 B2
(45) Date of Patent: Oct. 4, 2016

(54) SYSTEMS AND METHODS FOR USING ENHANCED RECEIVER AND GAPS WHEN HANDLING INTERFERENCE

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 190 days.

(21) Appl. No.: 14/154,882

(22) Filed: Jan. 14, 2014

(65) Prior Publication Data
US 2014/0206341 A1    Jul. 24, 2014

Related U.S. Application Data

(60) Provisional application No. 61/754,859, filed on Jan. 21, 2013.

(51) Int. Cl.
*H04B 17/00* (2015.01)
*H04W 4/00* (2009.01)
*H04W 36/00* (2009.01)

(52) U.S. Cl.
CPC ................. *H04W 36/0088* (2013.01)

(58) Field of Classification Search
None
See application file for complete search history.

(56) References Cited

U.S. PATENT DOCUMENTS

| 2007/0109973 A1 | 5/2007 | Trachewsky |
| 2012/0014476 A1* | 1/2012 | Kuchi ............... H04B 7/024 375/296 |
| 2012/0051303 A1 | 3/2012 | Dhanda et al. |
| 2012/0069889 A1 | 3/2012 | Molnar et al. |
| 2013/0157672 A1 | 6/2013 | Chou et al. |
| 2014/0200001 A1* | 7/2014 | Song ............... H04W 36/0094 455/436 |

FOREIGN PATENT DOCUMENTS

WO    2014112916 A1    7/2014

OTHER PUBLICATIONS

Author Unknown, "3rd Generation Partnership Project: On Cell Identification with FeICIC (R4-125775)", 3rd Generation Partnership Project (3GPP TSG-RAN WG4 Meeting #64bis), Agenda Item: 6.15.1.3, Oct. 8-12, 2012, 3 pages,Santa Rosa, CA.

(Continued)

*Primary Examiner* — Erika Washington
(74) *Attorney, Agent, or Firm* — Withrow & Terranova, PLLC

(57) ABSTRACT

Systems and methods that enable use of enhanced receiver techniques together with measurement gaps for measuring or reading a signal or channel from a target cell are disclosed. In one embodiment, a wireless device has an enhanced receiver and operates to measure interference from a first cell during one or more gaps created for a second cell to thereby obtain one or more interference measurements and then mitigate the interference during reception of a signal from a cell other than the first cell based on the one or more interference measurements using an enhanced receiver technique. The one or more gaps for the second cell are one or more gaps in downlink reception from the second cell, uplink transmission to the second cell, or a combination thereof. In this manner, the need for simultaneous reception for both the first cell and the other cell for interference mitigation is avoided.

17 Claims, 21 Drawing Sheets

(56) References Cited

OTHER PUBLICATIONS

Author Unknown, "3rd Generation Partnership Project: On Measurements with Enhanced Receiver for FeICIC (R4-130626)", 3rd Generation Partnership Project (3GPP TSG-RAN WG4 Meeting #66), Agenda Item: 5.3.3, Jan. 28-Feb. 1, 2013, 2 pages, St. Julian's, Malta.

Author Unknown, "3rd Generation Partnership Project; Technical Specification Group Radio Access Network; Evolved Universal Terrestrial Radio Access (E-UTRA)and Evolved Universal Terrestrial Radio Access Network (E Utran); Overall description; Stage 2 (Release 10)," Technical Specificatio 36.300, Version 10.9.0, Dec. 2012, 3GPP Organizational Partners, 194 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 10)," Technical Specification 36.331, Version 10.1.0, Mar. 2011, 3GPP Organizational Partners, 290 pages.

Author Unknown, "3rd Generation Partnership Project; Technical Specification Group Radio Access Network; Evolved Universal Terrestrial Radio Access Network (E-UTRAN); X2 application protocol (X2AP) (Release 11)," Technical Specification 36.423, Version 11.3.0, Dec. 2012, 3GPP Organizational Partners, 141 pages.

International Search Report and Written Opinion for PCT/SE2013/051466 mailed Apr. 8, 2014, 8 pages.

Author Unknown, "3rd Generation Partnership Project; Technical Specification Group Radio Access Network; Evolved Universal Terrestrial Radio Access (E-UTRA); Requirements for support of radio resource management (Release 11)," Technical Specification 36.133, Version 11.3.0, Dec. 2012, 3GPP Organizational Partners, 662 pages.

Author Unknown, "3rd Generation Partnership Project; Technical Specification Group Radio Access Network; Evolved Universal Terrestrial Radio Access (E-UTRA); Base Station (BS) radio transmission and reception (Release 11)," Technical Specification 36.104, Version 11.2.0, Sep. 2009, 3GPP Organizational Partners, 124 pages.

Author Unknown, "3rd Generation Partnership Project; Technical Specification Group Radio Access Network; Evolved Universal Terrestrial Radio Access (E-UTRA); User Equipment (UE) radio transmission and reception (Release 11)," Technical Specification 36.101, Version 11.2.0, Sep. 2012, 3GPP Organizational Partners, 359 pages.

Second Written Opinion for PCT/SE2013/051466 mailed Dec. 18, 2014, 4 pages.

Non-Final Office Action for U.S. Appl. No. 14/234,535, mailed Aug. 5, 2016, 16 pages.

\* cited by examiner

FIG. 3

SYSTEMS AND METHODS FOR USING ENHANCED RECEIVER AND GAPS WHEN HANDLING INTERFERENCE

RELATED APPLICATIONS

This application claims the benefit of provisional patent application Ser. No. 61/754,859, filed Jan. 21, 2013, the disclosure of which is hereby incorporated herein by reference in its entirety.

FIELD OF THE DISCLOSURE

The present disclosure relates to a cellular communications network and more particularly relates to a cellular communications network in which enhanced receivers are used to handle interference.

BACKGROUND

In Universal Mobile Telecommunications System (UMTS)/High Speed Downlink Packet Access (HSDPA), several interference aware receivers have been specified for the User Equipment device (UE). Such receivers are termed "enhanced receivers" as opposed to the baseline receiver, which is typically a rake receiver. There are several different types of enhanced receivers in UMTS including an enhanced receiver type 1 having two branch receiver diversity, an enhanced receiver type 2 having a single branch equalizer, an enhanced receiver type 3 having two branch receiver diversity and an equalizer, and an enhanced receiver type 3i having two branch receiver diversity and inter-cell interference cancellation capability. The enhanced receivers can be used to improve performance, e.g., in terms of throughput and/or coverage.

In Third Generation Partnership Project (3GPP) Long Term Evolution (LTE) Release 10 (Rel-10), enhanced interference coordination techniques have been developed to mitigate potentially high interference, e.g., in a cell range expansion zone, while providing the UE with time-domain measurement restriction information. Further, for LTE Release 11 (Rel-11), advanced receivers based on Minimum Mean Square Error—Interference Rejection Combining (MMSE-IRC) with several covariance estimation techniques and interference-cancellation-capable receivers (for different types of signals and channels) have been studied. In the future, even more complex advanced receivers, e.g., Minimum Mean Square Error—Successive Interference Cancellation (MMSE-SIC), which is capable of performing non-linear subtractive-type interference cancellation, can be used to further enhance system performance.

Such enhanced receiver techniques generally may benefit all deployments where relatively high interference of one or more signals is experienced when performing measurements on radio signals or channels transmitted by radio nodes or devices, but are particularly useful in heterogeneous deployments. However, these enhanced receiver techniques involve additional complexity, e.g., may require more processing power and/or more memory. Due to these factors, an advanced receiver may be used by the UE for mitigating interference only on specific signals or channels. For example, a UE may apply an interference mitigation or cancellation technique only on a data channel. In another example, a more sophisticated UE may apply interference mitigation on a data channel as well as on one or two common control signals. Examples of common control signals are reference signals, synchronization signals, etc.

It should be noted that the terms interference mitigation receiver, interference cancellation receiver, interference suppression receiver, interference rejection receiver, interference aware receiver, interference avoidance receiver, etc. are interchangeably used but they all belong to a category of an advanced receiver or an enhanced receiver. All of these different types of enhanced receivers improve performance by fully or partly eliminating the interference arising from at least one interfering source. The interfering source is generally the strongest interferer(s), which are signals from the neighboring cells when the action is performed in the UE. Therefore, a more generic term, "enhanced receiver," which covers all variants of advanced receiver, is used hereinafter. Further, the corresponding interference handling techniques (e.g., interference cancellation, interference suppression, puncturing or interference rejection combining) for enhanced receivers are referred to herein as "enhanced receiver techniques."

Co-channel, or intra-frequency, interference is the most common type of interference in the context of enhanced receivers. In a cellular communications network, a UE performs intra-frequency measurements, for example, in scenarios illustrated in FIG. 1. The intra-frequency measurements may be performed for various purposes such as, for example, Radio Resource Management (RRM), positioning, interference coordination, Self-Optimizing Network (SON), etc. More specifically, FIG. 1 illustrates transmission bandwidths for a UE, a current (or serving) cell of the UE, and a target cell for which the UE performs intra-frequency measurements for three different scenarios, namely, scenarios A, B, and C. The heights of the bars in each of the scenarios represent the corresponding transmission bandwidths. Note that while only one current (or serving) cell is illustrated for the UE, the UE may have multiple serving cells if Carrier Aggregation (CA) is used (i.e., one primary cell (pCell) and one or more secondary cells (sCells)). The transmissions in the current and target cells may be any one or more of: Downlink (DL) transmissions, Uplink (UL) transmissions, and device-to-device transmissions. For example, in a Time Division Duplexing (TDD) band, DL and UL transmissions occur on the same frequency according to an UL/DL configuration. In earlier LTE releases, TDD networks have been assumed to always be synchronized, and TDD cells have been assumed to have the same UL/DL configuration. However, e.g., with dynamic TDD, it may become possible to use different UL/DL configurations in different cells (currently under study in 3GPP), which implies the possibility of a scenario where DL is transmitted in one cell while UL is transmitted in another cell at the same time. Similarly, device-to-device transmission may occur in parallel to another device-to-device transmission or another DL or UL transmission. Note that while intra-frequency interference is the most common in the context of enhanced receivers, enhanced receivers may also potentially handle inter-frequency or even inter-Radio Access Technology (RAT) interference, e.g., when the interfering channel transmission bandwidth overlaps with the measured bandwidth.

Enhanced receivers may be used in either homogeneous cellular communications networks (i.e., homogeneous deployments) or heterogeneous cellular communications networks (i.e., heterogeneous deployments). Note that there may also be scenarios where part(s) of the cellular communications network have a heterogeneous deployment(s) and other part(s) have a homogeneous deployment(s). This is referred to as a mixed deployment.

Homogeneous cellular communications networks are typically deployments with the same/similar type of radio network nodes and/or similar coverage and cell sizes and inter-site distances. Although interference coordination may be more challenging in heterogeneous deployments, there may also be significant benefits of using enhanced receivers in homogeneous cellular communications networks.

In contrast to homogeneous network deployments, heterogeneous network deployments utilize low-power nodes (such as pico base stations, home Evolved Node Bs (eNBs), relays, remote radio heads, etc.) for enhancing performance of the macro network in terms of the network coverage, capacity, and service experience of individual users. The interest in heterogeneous network deployments has been constantly increasing over the last few years. At the same time, there has been realized a need for enhanced interference management techniques to address new interference issues caused by, for example, a significant transmit power variation among different cells and cell association techniques developed earlier for more uniform networks.

In 3GPP, heterogeneous network deployments have been defined as deployments where low-power nodes (e.g., pico nodes) of different transmit powers are placed throughout a macro cell layout, which implies non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adapt to traffic needs and the environment. However, heterogeneous network deployments also bring challenges for which the network has to be prepared in order to ensure efficient network operation and superior user experience. Some challenges are related to increased interference resulting from the attempt to increase coverage areas of small cells associated with low-power nodes (i.e., cell range expansion). Other challenges are related to potentially high interference in the UL due to a mix of large and small cells.

According to 3GPP, heterogeneous deployments consist of deployments where low power nodes are placed throughout a macro cell layout. The interference characteristics in a heterogeneous deployment can be significantly different than in a homogeneous deployment, in DL or UL or both. In this regard, FIG. 2 illustrates one example of a heterogeneous cellular communications network 10 that includes a macro base station 12 (e.g., an eNB) serving a macro cell 14, a number of low-power base stations 16-1 through 16-3 (e.g., home eNBs) serving corresponding Closed Subscriber Group (CSG) cells 18-1 through 18-3, and a low-power base station 20 (e.g., a pico base station) serving a pico cell 22. FIG. 2 also illustrates four cases, each illustrating a different interference scenario. In case (A), a macro UE 24 (i.e., a UE served by the macro base station 12) with no access to the CSG cell 18-1 will experience interference caused by transmissions from the low-power base station 16-1 serving the CSG cell 18-1. In case (B), a macro UE 26 with no access to the CSG cell 18-2 causes severe interference towards the low-power base station 16-2 serving the CSG cell 18-2. In case (C), a CSG UE 28 (i.e., a UE served by a CSG cell) is served by the CSG cell 18-3 but will experience interference from the low-power base station 16-2 serving the CSG cell 18-2. Lastly, in case (D), a UE 30 is served by the low-power base station 20 in an expended cell range area 32 of the pico cell 22. The UE 30 in the extended cell range area 32 of the pico cell 22 will experience DL interference from the macro base station 12 and may also cause UL interference to the macro base station 12. Note that while several of the cases illustrated in FIG. 2 use CSG cells, a heterogeneous deployment does not necessarily involve CSG cells.

To ensure reliable and high-bitrate transmissions as well as robust control channel performance, maintaining a good signal quality is a must in cellular communications networks. The signal quality is determined by the received signal strength and its relation to the total interference and noise received by the receiver. A good network plan, which among others things includes cell planning, is a prerequisite for successful network operation. However, the network plan is static. For more efficient radio resource utilization, a good network plan has to be complemented at least by semi-static and dynamic radio resource management mechanisms, which are also intended to facilitate interference management, and deploying more advanced antenna technologies and algorithms.

One way to handle DL interference is, for example, to adopt enhanced receiver technologies, e.g. by implementing interference cancellation mechanisms in UEs. Another way, which can be complementary to the former, is to design efficient interference coordination algorithms and transmission schemes in the network. The coordination may be realized in static, semi-static, or dynamic fashion. Static or semi-static schemes may rely on reserving time-frequency resources (e.g., a part of the bandwidth and/or time instances) that are orthogonal for strongly interfering transmissions. Dynamic coordination may be implemented, e.g., by means of scheduling. Such interference coordination may be implemented for all or specific channels (e.g., data channels or control channels) or signals.

Specifically for heterogeneous network deployments, enhanced Inter-Cell Interference Coordination (eICIC) mechanisms for ensuring that the UE performs at least some measurements (e.g., Radio Resource Management (RRM), Radio Link Monitoring (RLM), and Channel State Information (CSI) measurements) in low-interference subframes of the interfering cell have been standardized. These mechanisms involve configuring patterns of low-interference subframes at transmitting nodes to thereby reduce interference, and configuring measurement patterns for UEs to thereby indicate to the UEs low-interference measurement occasions.

Two types of patterns have been defined for eICIC in LTE Rel-10 to enable restricted measurements in DL, namely, restricted measurement patterns and transmission patterns. The restricted measurement patterns are configured by a network node and signaled to the UE. The transmission patterns, which are also known as Almost Blank Subframe (ABS) patterns, are configured by a network node and describe the transmission activity of a radio node. Transmission patterns may be exchanged between radio nodes.

More specifically, with regard to restricted measurement patterns for the DL in LTE, the UE may receive a set of restricted measurement patterns to enable measurements for RRM (e.g., Reference Signal Received Power (RSRP)/ Reference Signal Received Quality (RSRQ)), RLM, and CSI as well as for demodulation. As defined in 3GPP Technical Specification (TS) 36.331 V10.1.0, the UE may receive, via Radio Resource Control (RRC) UE-specific signaling, the following set of patterns:

Pattern 1: A single RRM/RLM measurement resource restriction for the serving cell.

Pattern 2: One RRM measurement resource restriction for neighbor cells (up to 32 cells) per frequency (currently only for the serving frequency).

Pattern 3: Resource restriction for CSI measurement of the serving cell with two subframe subsets configured per UE.

A pattern is a bit string indicating restricted and unrestricted subframes characterized by a length and periodicity, which are different for Frequency Division Duplexing (FDD) and TDD (40 subframes for FDD and 20, 60, or 70 subframes for TDD). The restricted subframes are configured to allow the UE to perform measurements in subframes with improved interference conditions, which may be implemented by configuring ABS patterns at the base stations.

In addition to RRM/RLM, Pattern 1 may also be used to enable UE Receive (Rx)—Transmit (Tx) measurements, which are timing measurements similar to round trip time, in low-interference conditions or in principle for any Cell-Specific Reference Signal (CRS) based measurement to improve the measurement performance when strong interference may be reduced by configuring low-interference subframes. Pattern 3 would typically be used for enhancing channel quality reporting and improving the performance of channel demodulation and decoding (e.g., of data channels such as Physical Downlink Shared Channel (PDSCH), control channels such as Physical Downlink Control Channel (PDCCH), Physical Control Format Indicator Channel (PCFICH), and Physical Hybrid Automatic Repeat Request (ARQ) Indicator Channel (PHICH)). Pattern 1 and Pattern 2 may also be used for enabling low-interference conditions for common signals (e.g., Primary Synchronization Signal (PSS)/Secondary Synchronization Signal (SSS)), common channels, and broadcast/multicast channels (e.g., Physical Broadcast Channel (PBCH)), when the strong interference can be reduced or avoided (e.g., when a time shift is applied to ensure that the common channels/signals are interfered by data whose interference may be avoided by configuring low-interference subframes and thereby suppressing the interfering data transmissions).

With regard to DL ABS patterns, an ABS pattern indicates subframes when the base station (e.g., eNB) restricts its transmissions (e.g., does not schedule or transmits at a lower power). The subframes with restricted transmissions are referred to as ABS subframes. In the current LTE standard, a base station can suppress data transmissions in ABS subframes but the ABS subframes cannot be fully blank—at least some of the control channels and physical signals are still transmitted. Examples of control channels that are transmitted in ABS subframes even when no data is transmitted are PBCH and PHICH. Examples of physical signals that have to be transmitted regardless of whether the subframes are ABSs or not are CRS and synchronization signals (PSS and SSS). Positioning Reference Signals (PRS) may also be transmitted in ABS subframes. If a Multimedia Broadcast Single Frequency Network (MBSFN) subframe coincides with an ABS, the MBSFN subframe is also considered as an ABS, as set forth in 3GPP TS 36.423. CRS are not transmitted in MBSFN subframes, except for the first symbol, which allows for avoiding CRS interference from an aggressor cell to the data region of a measured cell. ABS patterns may be exchanged between base stations, e.g., via X2, but these patterns are not signaled to the UE.

In LTE Rel-11, for enhanced receivers (e.g., capable of interference cancellation), the information about a strongly interfering cell, which is also known as an aggressor cell, may be provided to facilitate handling the strong interference generated by transmissions in that cell. The currently agreed information is as below, i.e., the following information about the interfering cells may be provided to the UE: Physical Cell Identity (PCI), number of CRS antenna ports, and MBSFN subframe configuration.

```
NeighCellsCRS-Info-r11 ::= CHOICE {
    release                 NULL,
    setup                   CRS-AssistanceInfoList-r11
}
CRS-AssistanceInfoList-r11 ::= SEQUENCE (SIZE (1.. maxCellReport))
    OF CRS-AssistanceInfo
CRS-AssistanceInfo ::= SEQUENCE {
    physCellId-r11          PhysCellId,
    antennaPortsCount-r11   ENUMERATED {an1, an2, an4,
                                        spare1},
    mbsfn-SubframeConfigList-r11  MBSFN-SubframeConfigList
}
```

In high interference scenarios, it may be challenging to read System Information (SI) including the Master Information Block (MIB), which is transmitted via PBCH, and the System Information Blocks (SIBs), which are transmitted via PDSCH. Hence, some UEs are likely to have interference cancellation capability to acquire PBCH while performing interference cancellation of the aggressor cell interference, e.g., in a radio frame aligned scenario such as that illustrated in FIG. 3 where PBCH transmissions by an aggressor cell cause interference to PBCH transmissions by a victim cell, which may be a serving cell or a measured cell. MIB interference cancellation may or may not involve MIB decoding.

The MIB is mapped on the Broadcast Control Channel (BCCH) and carried on the Broadcast Channel (BCH) while all other SI messages are mapped on the BCCH and dynamically carried on the Downlink Shared Channel (DL-SCH) where they can be identified through the System Information Radio Network Temporary Identifier (SI-RNTI). The MIB is transmitted according to a fixed schedule with a periodicity of 40 microseconds (ms) in subframes #0. To improve MIB detection performance, three redundancy versions are also signaled with a 10 ms period.

The SIB Type 1 (SIB1) is transmitted with a periodicity of 80 ms and repetitions made within 80 ms. The first transmission of SIB1 is scheduled in subframe #5 of radio frames for which the System Frame Number (SFN) mod 8=0, and repetitions are scheduled in subframe #5 of all other radio frames for which SFN mod 2=0, i.e., with a 20 ms period. The scheduling of other SI messages (e.g., periodicity and SI-window) is flexible and indicated by SIB1. Each SIB is contained only in a single SI message. Only SIBs having the same scheduling requirement (periodicity) can be mapped to the same SI message. There is also a limit on the maximum size of a SI message (217 bytes with Downlink Control Information (DCI) format 1C and 277 bytes with 1a format). The obtained SI is stored by the UE and considered invalid after three hours. The paging message is used to inform UEs in RRC_IDLE and UEs in RRC_CONNECTED about a system information change.

System information may also be provided to the UE by means of dedicated signaling, e.g. upon handover. Furthermore, to facilitate receiver performance in high interference conditions, according to 3GPP TS 36.300, the network may provide SIB1 to the UE in the Cell Range Expansion (CRE) region by a dedicated RRC signaling to assist UE system information acquisition. According to 3GPP TS 36.331, in addition to system information broadcast, the Evolved Universal Terrestrial Radio Access Network (E-UTRAN) may provide the same SIB1 via dedicated signaling in the RRC-ConnectionReconfiguration message, as follows:

```
RRCConnectionReconfiguration-v1020-IEs ::= SEQUENCE {
    sCellToReleaseList-r10      SCellToReleaseList-r10
                                OPTIONAL, --Need ON
    sCellToAddModList-r10       SCellToAddModList-r10
                                OPTIONAL, --Need ON
    nonCritical Extension       RRCConnectionReconfiguration-
                                v11xx-IEs OPTIONAL
}
RRCConnectionReconfiguration-v11xx-IEs ::= SEQUENCE {
    systemInfomationBlockType1Dedicated-r11   OCTET STRING
                                              (CONTAINING
                                              SystemInformation
                                              BlockType1)
                                              OPTIONAL,
                                              -- Need ON
    nonCritical Extension                     SEQUENCE { }
                                              OPTIONAL
                                              -- Need OP
}
```

The LTE standards starting with LTE Rel-9 allow the UE to create autonomous gaps for intra-frequency, inter-frequency, or inter-RAT Cell Global Identification (CGI)/SI reading. The target cell whose CGI can be read can be an intra-frequency cell, an inter-frequency cell, or even an inter-RAT cell (e.g., Universal Terrestrial Radio Access Network (UTRAN), Global System for Mobile Communications (GSM) EDGE Radio Access Network (GERAN), Code Division Multiple Access 2000 (CDMA2000) or High Rate Packet Data (HRPD)). There are at least a few well known scenarios for which the serving cell may request the UE to report the CGI of the target cell, namely, verification of a CSG cell, establishment of Self Organizing Network (SON) Automatic Neighbor Relation (ANR), and Minimization of Drive Tests (MDT). In addition to the CGI, the SI also contains other information such as, e.g., SFN, which may be acquired for many purposes, e.g., for positioning when SFN of the reference cell is not known (e.g., inter-frequency Reference Signal Time Difference (RSTD) measurements when the reference cell and the neighbor cells in the assistance data are not on the serving cell frequency).

In LTE, the UE is required to report the intra-frequency E-UTRAN CGI (ECGI) from a target intra-frequency cell within about 150 ms provided that the Signal-to-Interference-Plus-Noise Ratio (SINR) for the target intra-frequency cell is at a certain level or higher. In order to meet this requirement, the UE is allowed to create autonomous gaps in the DL and UL during which to read the ECGI of the target intra-frequency cell. Under continuous allocation, the UE is required to transmit a certain number of Acknowledgements (ACKs)/Negative Acknowledgements (NACKs) on the UL to ensure that the UE does not create excessive gaps. In UTRAN, the target cell's CGI acquisition is much longer, e.g., more than one second, depending upon the periodicity of SIB Type 3 (SIB3), which contains the CGI. Furthermore due to the autonomous gaps created by the UE to acquire the CGI of the target cell, the interruption of the data transmission and reception from the serving cell can be 600 ms or longer.

As discussed above, in E-UTRAN, the serving cell can request the UE to acquire the CGI, which uniquely identifies a cell, of the target cell. In order to acquire the CGI of the target cell, the UE has to read at least part of the SI of the target cell including the MIB and the relevant SIB. The reading of the SI for the acquisition of the CGI of the target cell is carried out during measurement gaps in the transmission of the UL to the serving cell and/or the reception of the DL from the serving cell that are autonomously created by the UE. In LTE, the UE reads the MIB and SIB1 of the target cell to acquire its CGI (i.e., ECGI when the target cell is E-UTRAN intra- or inter-frequency).

In LTE, the MIB includes a limited number of most essential and most frequently transmitted parameters that are needed to acquire other information from the cell, and is transmitted on the BCH. In particular, the following information is currently included in MIB: DL bandwidth, PHICH configuration, and SFN. The LTE SIB1, as well as other SIB messages, is transmitted on DL-SCH. In LTE, the SIB1 contains, e.g., the following information: Public Land Mobile Network (PLMN) identity, cell identity, which can be a physical cell ID (PCI) or a cell global ID (CGI), CSG identity and indication, frequency band indicator, SI window length, and scheduling information for other SIBs. The LTE SIB1 may also indicate whether a change has occurred in the SI messages. The UE is notified about upcoming changes in the SI by paging messages (i.e., upon receipt of a paging message, the UE knows that the SI will change at the next modification period boundary). The modification period boundaries are defined by SFN values for which SFN mod m=0, where m is the number of radio frames comprising the modification period. The modification period is configured by system information. In case of inter-RAT UTRAN, the UE reads the MIB and SIB3 of the target UTRAN cell to acquire the CGI of the target UTRAN cell.

In LTE, a timer T321 is used when a CGI report is requested by the network. The T321 timer is started upon receiving a measConfig message including a reportConfig with the purpose set to reportCGI. The timer T321 is stopped upon acquiring the information needed to set all fields of cellGlobalId for the requested cell or upon receiving measConfig that includes removal of the reportConfig with the purpose set to reportCGI. Upon expiry of the timer T321, the measurement reporting procedure is initiated and the UE stops performing the related measurements and removes the corresponding measId.

SUMMARY

Systems and methods that enable use of enhanced receiver techniques together with measurement gaps for measuring or reading a signal or channel from a target cell are disclosed. In one embodiment, a wireless device for operation in a cellular communications network has an enhanced receiver and operates to measure interference from a first cell during one or more gaps created for a second cell to thereby obtain one or more interference measurements and then mitigate the interference during reception of a signal from a cell other than the first cell based on the one or more interference measurements using an enhanced receiver technique. The one or more gaps for the second cell are one or more gaps in downlink reception from the second cell, uplink transmission to the second cell, or a combination thereof. In this manner, the need for simultaneous reception for both the first cell and the other cell for interference mitigation is avoided.

In one embodiment, the cell other than the first cell is the second cell. Further, in one embodiment, the interference measured by the wireless device includes interference generated by transmission of an interfering channel from the first cell, and the interference is mitigated during reception of a same channel type as the interfering channel from the second cell. In one embodiment, a total time for performing reception of the signal from the second cell is extended to account for the one or more gaps. In another embodiment, a total time for performing reception of the signal from the second cell excludes the one or more gaps.

In one embodiment, the wireless device measures the interference from the first cell during the one or more gaps created for the second cell during a first time period and mitigates the interference during reception of the signal from the second cell during a second time period that occurs after and does not overlap the first time period. In another embodiment, the wireless device measures the interference from the first cell during the one or more gaps created for the second cell during a first time period and mitigates the interference during reception of the signal from the second cell during a second time period that overlaps a portion of the first time period.

In one embodiment, the one or more gaps created for the second cell are one or more autonomous gaps created by the wireless device. In another embodiment, the wireless devices receives gap configuration information from a network node of the cellular communications network and creates the one or more gaps for the second cell based on the gap configuration information. In one embodiment, the gap configuration information includes information that is indicative of a time domain pattern for interference measurements.

In one embodiment, the interference from the first cell is generated by at least a channel transmitted by the first cell. In another embodiment, the interference from the first cell is generated by at least a channel transmitted by the first cell that includes system information for the first cell.

In another embodiment, the wireless device operates to measure interference generated by transmission of a first interfering channel by the first cell during one or more gaps created for the second cell during a first time period to thereby obtain a first interference measurement. The wireless device mitigates the interference generated by transmission of the first interfering channel during reception of a first victim channel from the cell other than the first cell during a second time period based on the first interference measurement. In addition, the wireless device operates to measure interference generated by transmission of a second interfering channel by the first cell during one or more gaps created for the second cell during a third time period to obtain a second interference measurement. The wireless device then mitigates the interference generated by transmission of the second interfering channel during reception of a second victim channel from the cell other than the first cell during a fourth time period based on the second interference measurement.

In one embodiment, the first, second, third, and fourth time periods are non-overlapping. In another embodiment, at least two of the first, second, third, and fourth time periods partially overlap.

In another embodiment, a wireless device having enhanced receiver capability for operation in a cellular communications network operates to restrict use of autonomous gaps during time-frequency resources in which one or more enhanced receiver techniques are used to perform reception of a first signal from a first cell, the autonomous gaps being gaps in downlink reception from the first cell created to receive a second signal from a second cell. By restricting the use of autonomous gaps when using enhanced receiver techniques, the wireless device ensures that autonomous gaps used to read a second signal from a second cell (e.g., one or more channels including system information of the second cell) are not created and, as a result, a negative impact on a performance of the enhanced receiver techniques caused by such autonomous gaps is avoided.

In one embodiment, the autonomous gaps are one or more autonomous gaps created to perform reception of one or more channels from the second cell that include system information of the second cell.

In one embodiment, the wireless device further operates to determine that the wireless device has enhanced receiver capability and, in response, restrict the use of autonomous gaps.

In another embodiment, the wireless device further operates to determine that an interference level at the wireless device is greater than a predefined threshold and, in response, restrict the use of the autonomous gaps during the time-frequency resources in which the one or more enhanced receiver techniques are used to perform reception of the first signal from the first cell.

In one embodiment, the wireless device operates to receive a measurement configuration from a network node of the cellular communications network, where the measurement configuration defines resources for interference measurements for the one or more enhanced receiver techniques. The wireless device restricts the use of the autonomous gaps according to the measurement configuration. Further, in another embodiment, the wireless device operates to receive an indicator from a network node of the cellular communications network, where the indicator is indicative of whether the wireless device is permitted to create the autonomous gaps during any resources other than those indicated by the measurement configuration. The wireless device restricts use of autonomous gaps during any resources other than those indicated by the measurement configuration according to the indicator.

In another embodiment, the wireless device operates to receive an indicator from a network node of the cellular communications network, where the indicator is indicative of whether the wireless device is permitted to create the autonomous gaps during reception of the first signal from the first cell using the one or more enhanced receiver techniques. The wireless device restricts the use of the autonomous gaps according to the indicator.

In another embodiment, the wireless device operates to receive a complementary pattern from a network node of the cellular communications network, where the complementary pattern defines resources during which the wireless device is permitted to create the autonomous gaps. The wireless device restricts the use of the autonomous gaps according to the complementary pattern.

In one embodiment, the one or more enhanced receiver techniques comprise one or more enhanced receiver techniques for mitigating interference caused by transmission of one or more channels by an aggressor cell, the one or more channels selected from a group consisting of: Physical Broadcast Channel (PBCH), Physical Downlink Shared Channel (PDSCH), Physical Downlink Control Channel (PDCCH), Physical Control Format Indicator Channel (PCFICH), and Physical Hybrid Automatic Repeat Request Indicator Channel (PHICH).

In yet another embodiment, a network node of a cellular communications network operates to determine that a wireless device has an enhanced receiver capability and, in response, adapt at least one of a group consisting of: transmission scheduling for the wireless device, measurement configuration for the wireless device, and reception configuration for the wireless device according to expected usage of autonomous gaps by wireless devices having an enhanced receiver capability for interference measurement.

In one embodiment, in response to determining that the wireless device has an enhanced receiver capability, the network node adapts the transmission scheduling for the wireless device according to expected usage of autonomous gaps by wireless devices having enhanced receiver capability for interference measurement. Further, in one embodiment, the adapting the transmission scheduling for the wireless device includes adapting transmission scheduling for the wireless device such that transmissions to the wireless device avoid resources during which autonomous gaps are expected to be used by the wireless device to measure interference.

In one embodiment, in response to determining that the wireless device has an enhanced receiver capability, the network node adapts the measurement configuration for the wireless device according to expected usage of autonomous gaps by wireless devices having enhanced receiver capability for interference measurement. Further, in one embodiment, adapting the measurement configuration for the wireless device includes adapting the measurement configuration for the wireless device such that measurements during resources in which the wireless device is expected to use an enhanced receiver technique are avoided.

In one embodiment, in response to determining that the wireless device has an enhanced receiver capability, the network node adapts the reception configuration for the wireless device according to expected usage of autonomous gaps by wireless devices having enhanced receiver capability for interference measurement. Further, in one embodiment, adapting the reception configuration for the wireless device includes adapting the reception configuration for the wireless device such that autonomous gaps for reception of one or more channels containing system information from a target cell are avoided during resources during which the wireless device is expected to measure interference for an enhanced receiver technique. In another embodiment, adapting the reception configuration for the wireless device includes avoiding measurement requests that would require autonomous gaps for reception of one or more channels containing system information from a target cell during resources during which the wireless device is expected to measure interference for an enhanced receiver technique.

In another embodiment, the network node further operates to signal a complementary pattern to the wireless device, where the complementary pattern is indicative of resources in which the wireless device is allowed to create gaps when utilizing an enhanced receiver technique.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
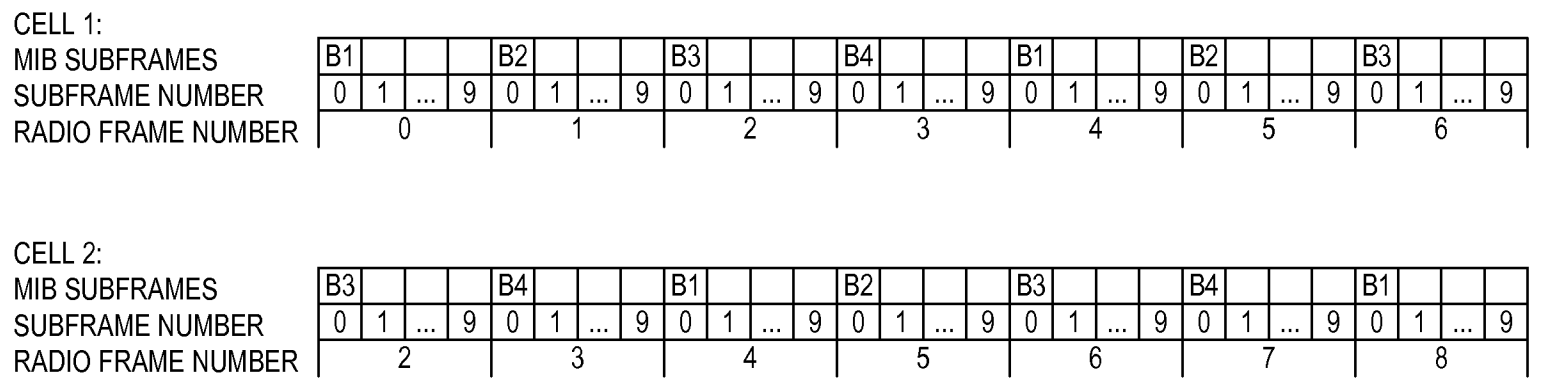

FIG. 3 illustrates a radio frame aligned interference scenario where a Physical Broadcast Channel (PBCH) transmission in an aggressor cell causes interference to a PBCH transmission in a victim cell;

Figure 5:
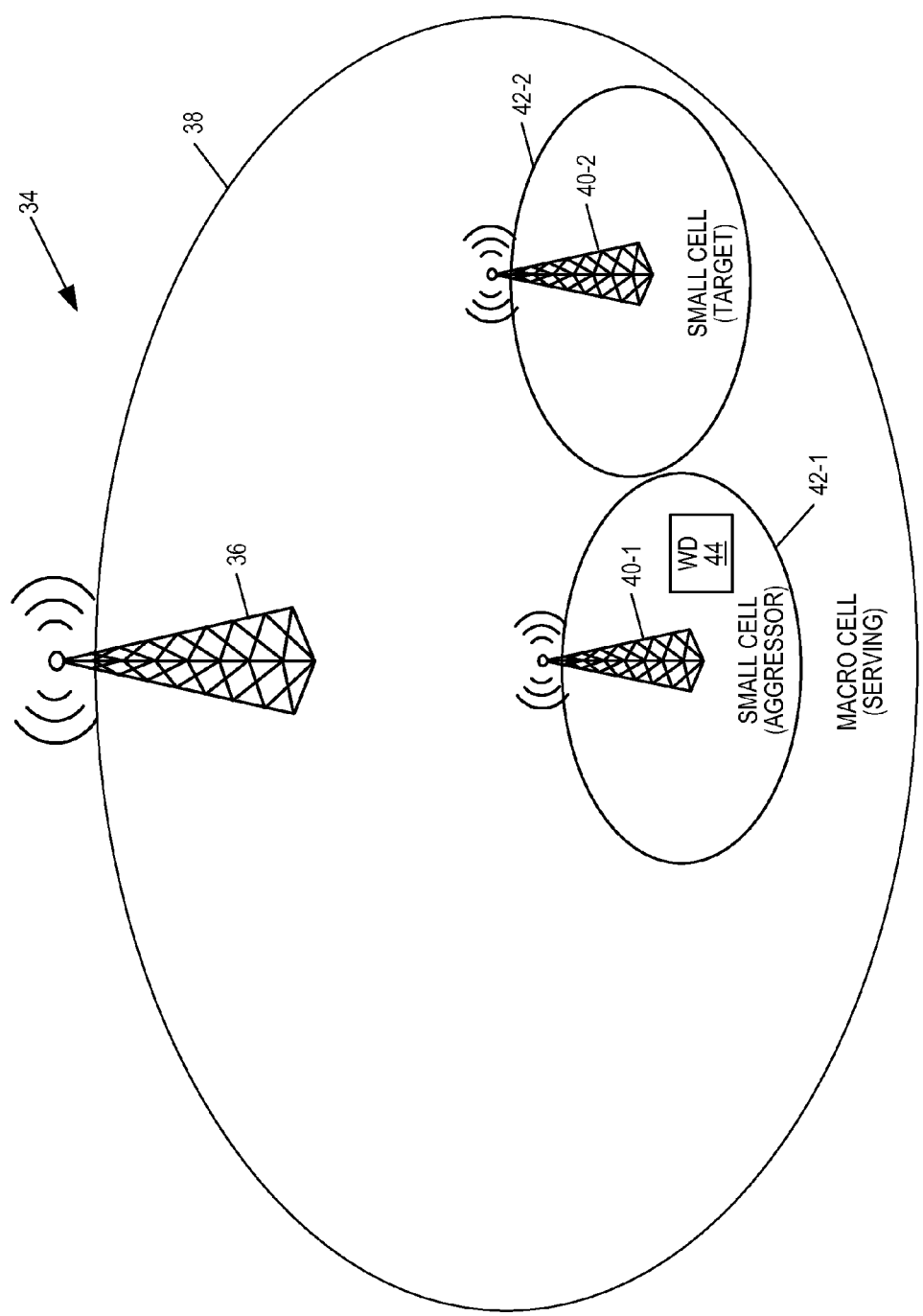
FIG. 5 illustrates one example of a heterogeneous deployment of a cellular communications network in which embodiments of the present disclosure may be implemented.
Figure 7:
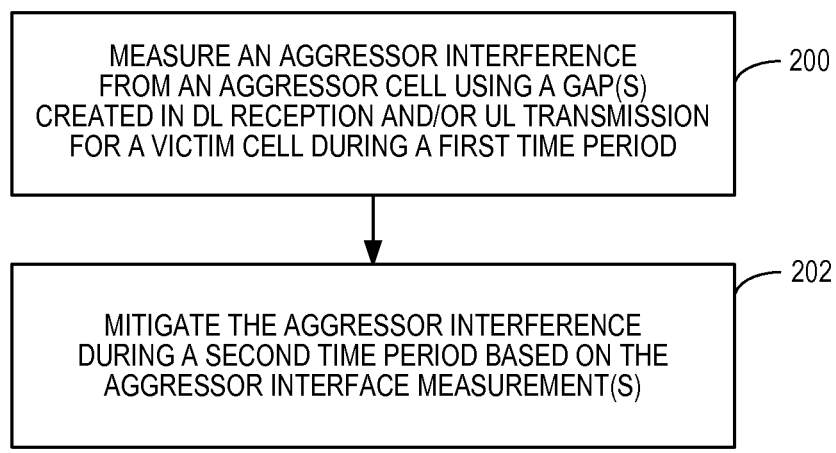
FIG. 7 is a flow chart that illustrates the operation of the wireless device of FIG. 5 to measure aggressor interference during a first time period and mitigate the aggressor interference during a second time period according to one embodiment of the present disclosure.
Figure 8:
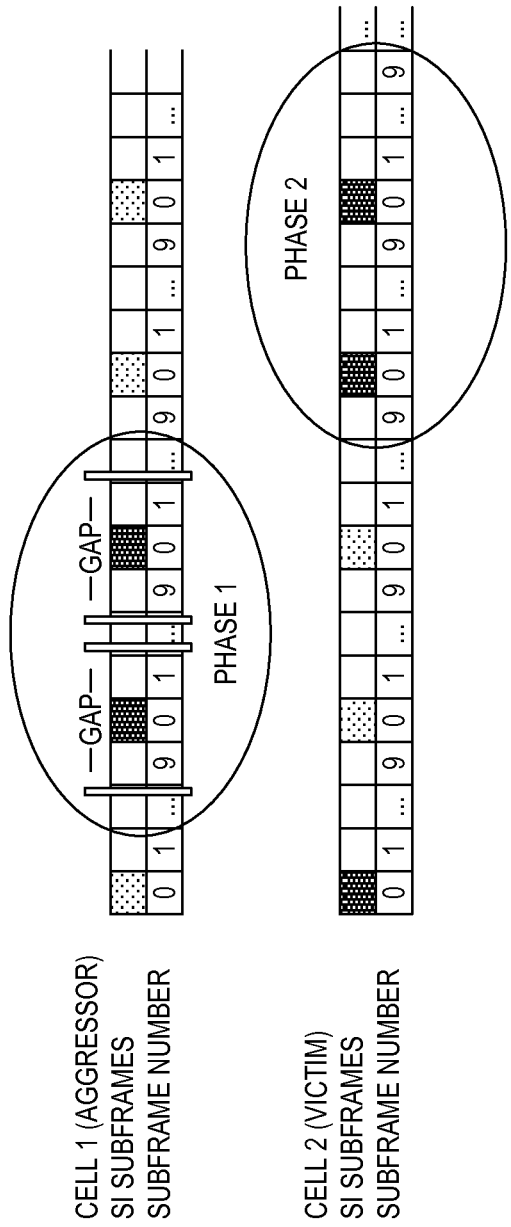
Figure 9:
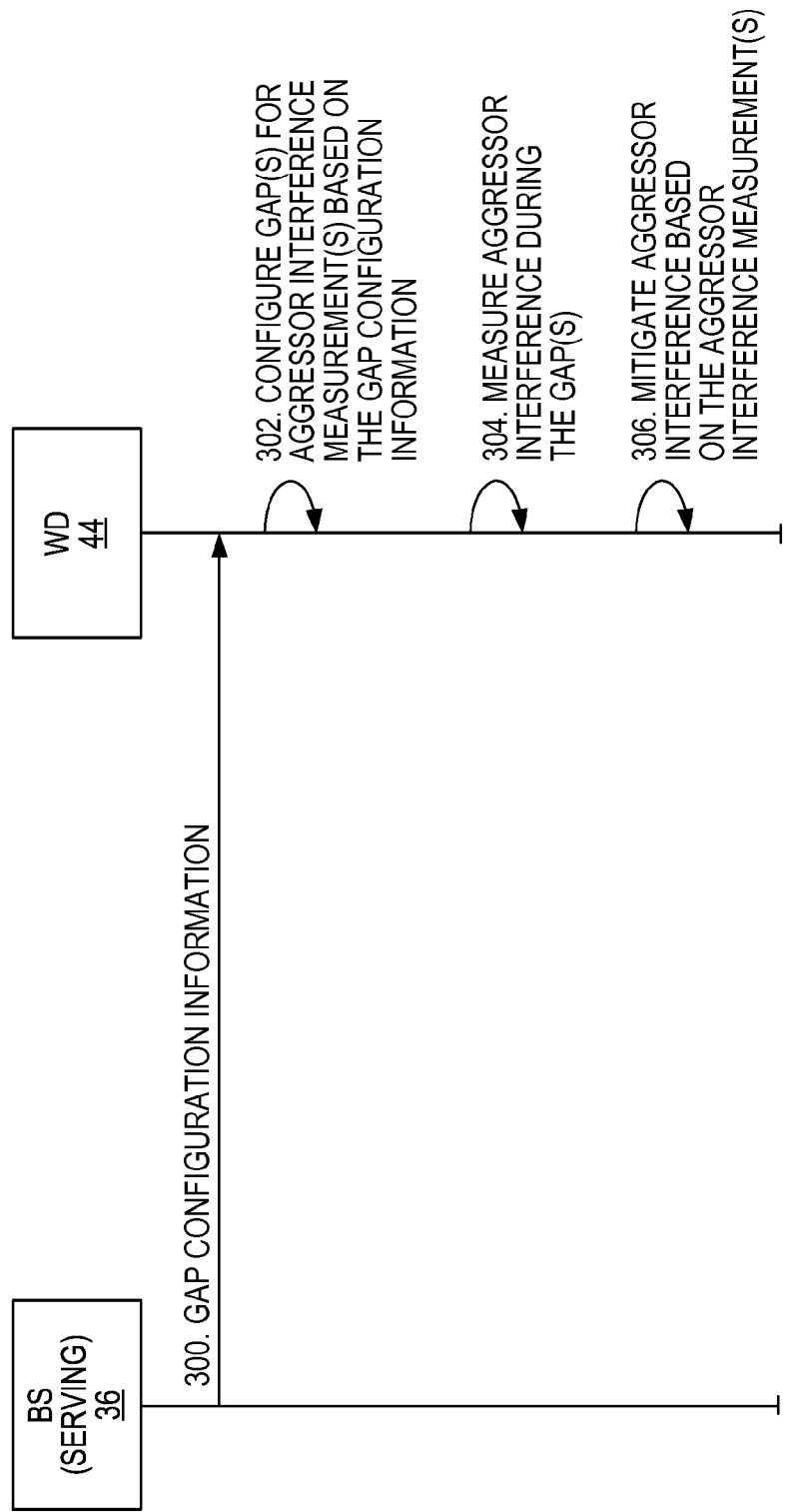
Figure 10:
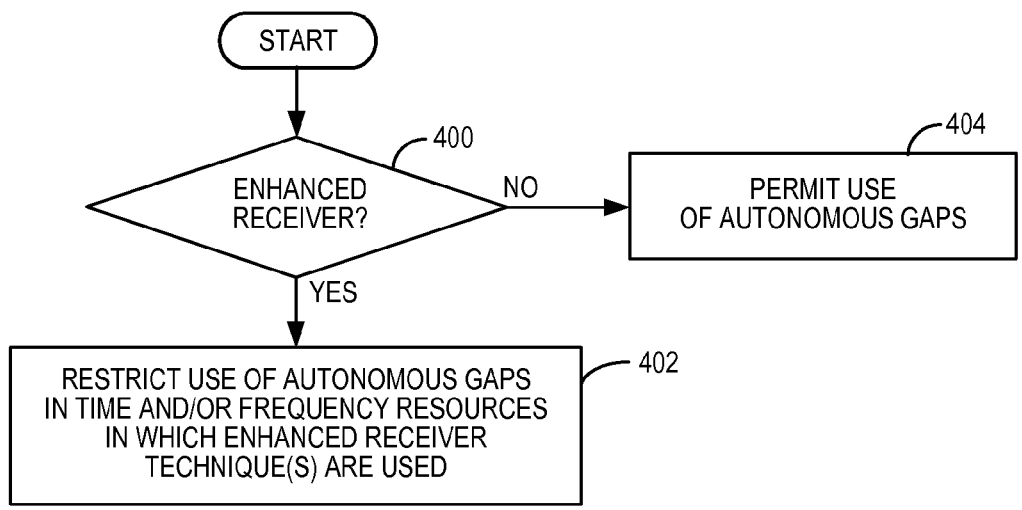
Figure 11:
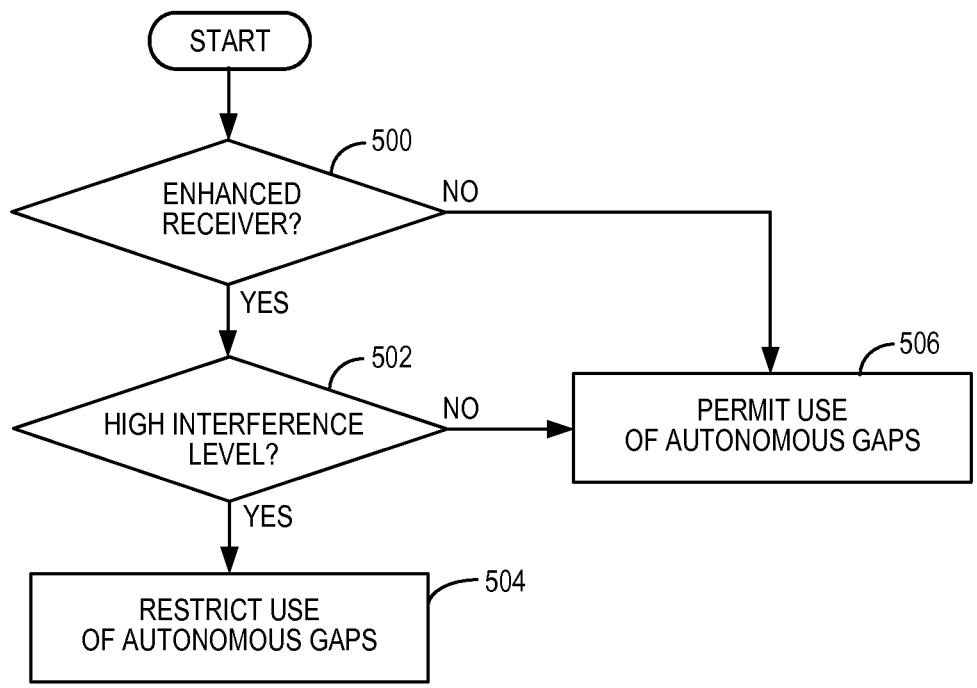
Figure 12:
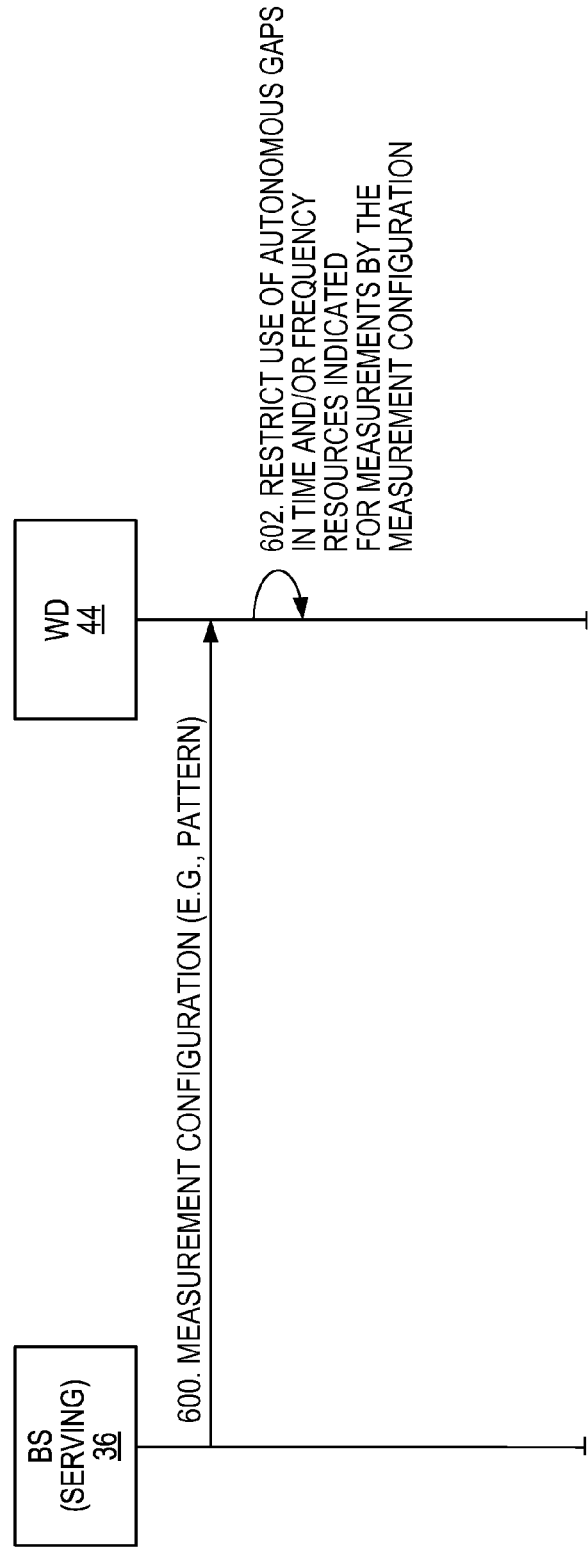
Figure 13:
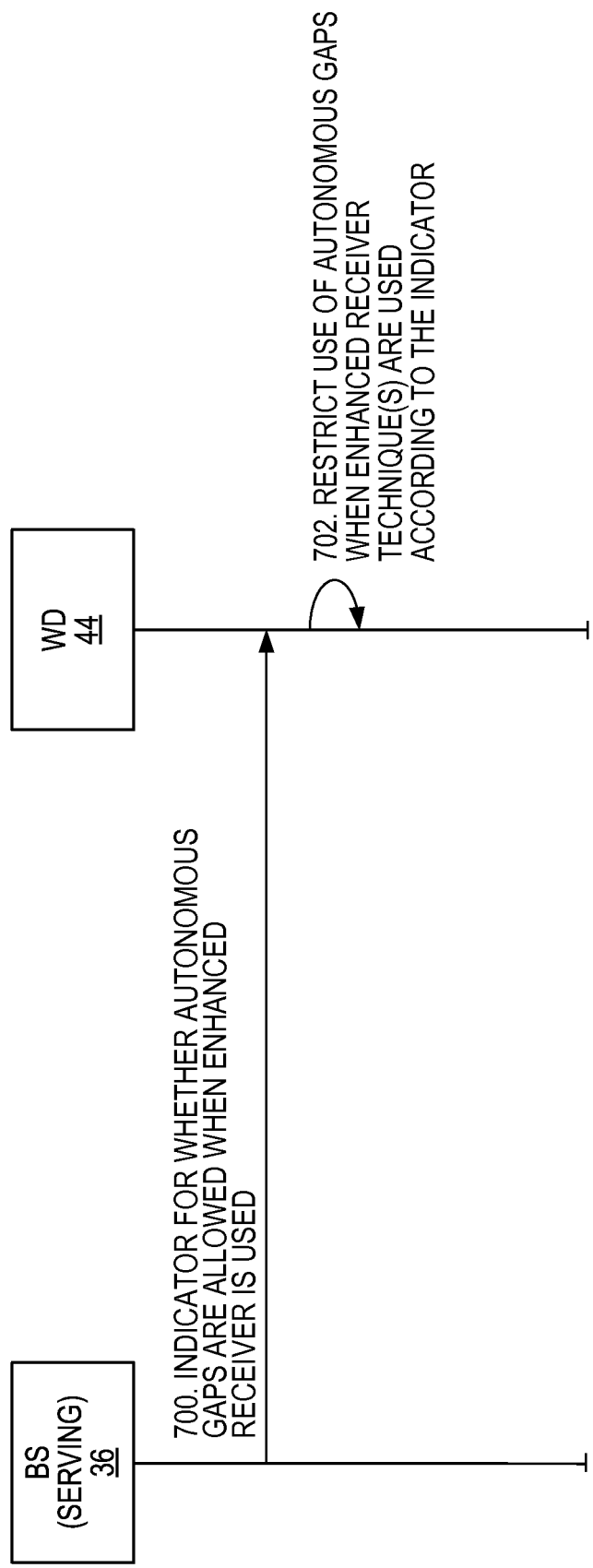
Figure 14:
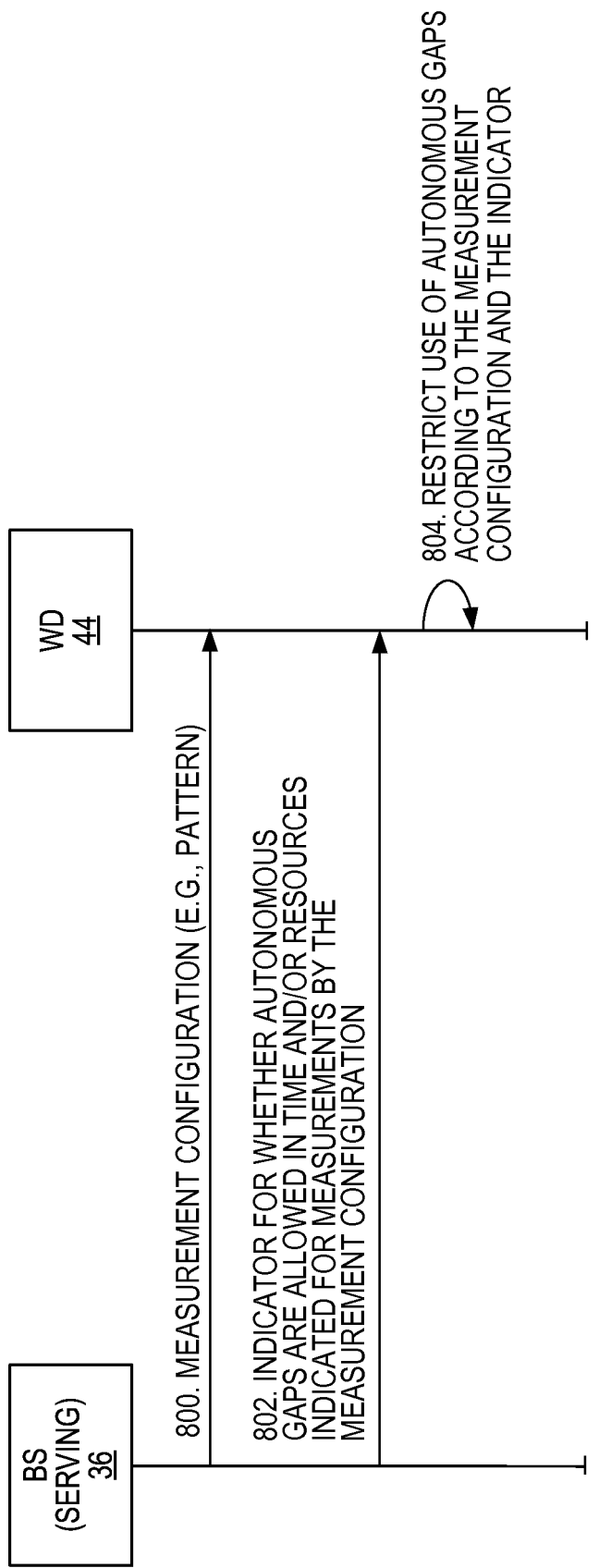
Figure 15:
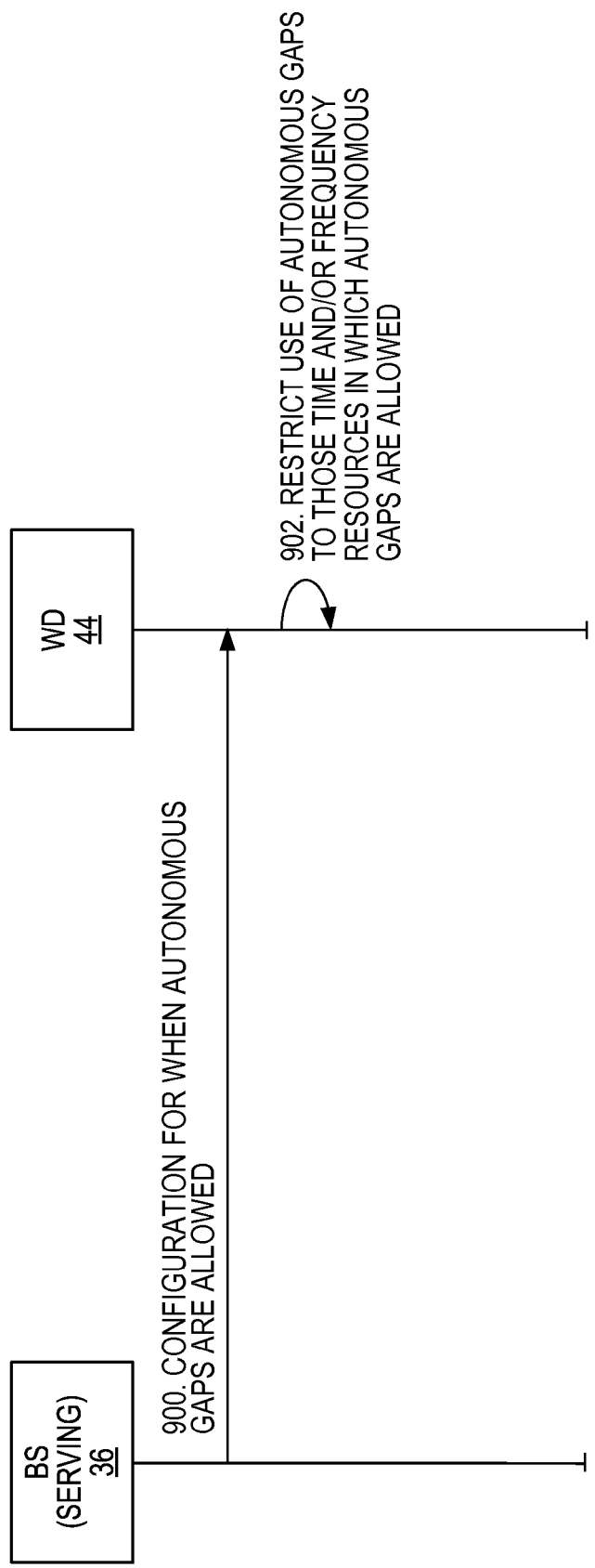
Figure 16:
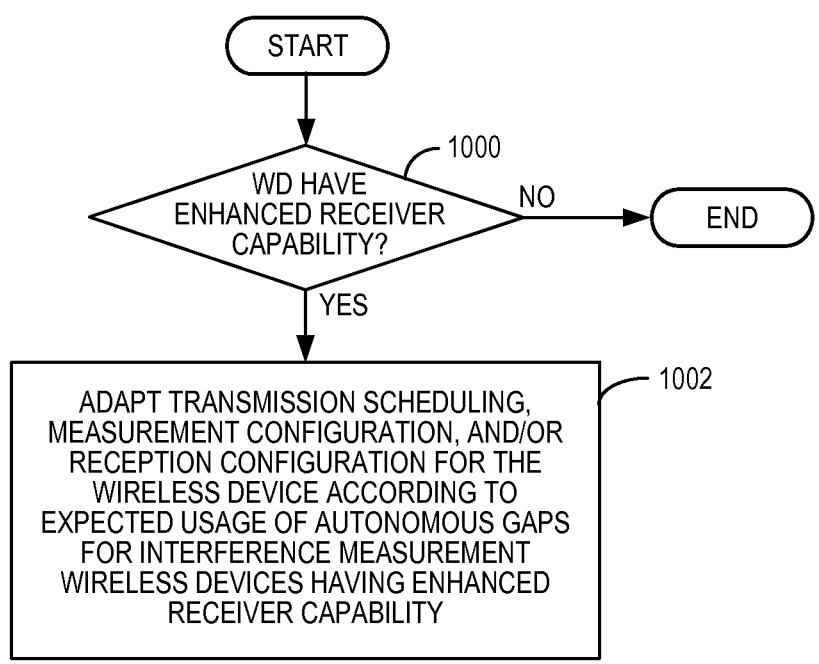
Figure 17:
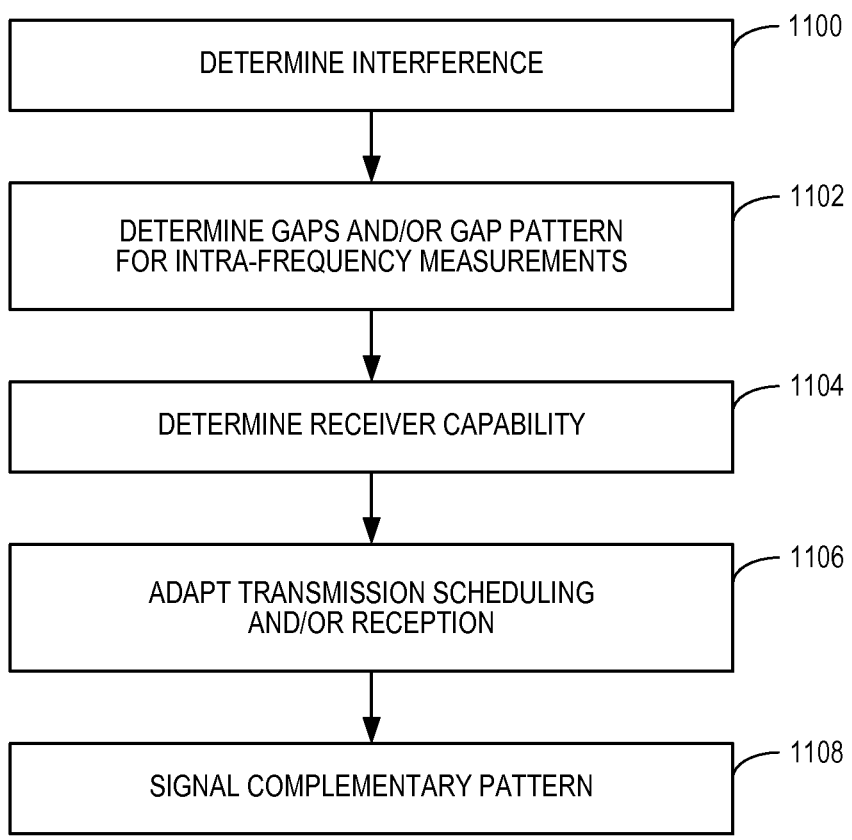
Figure 18:
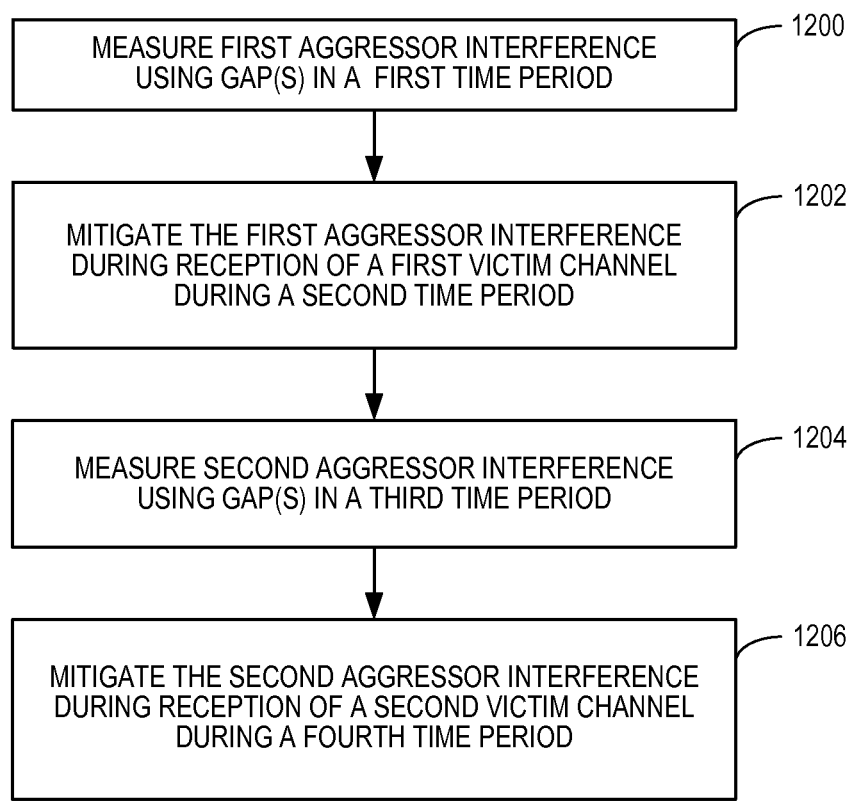
Figure 19:
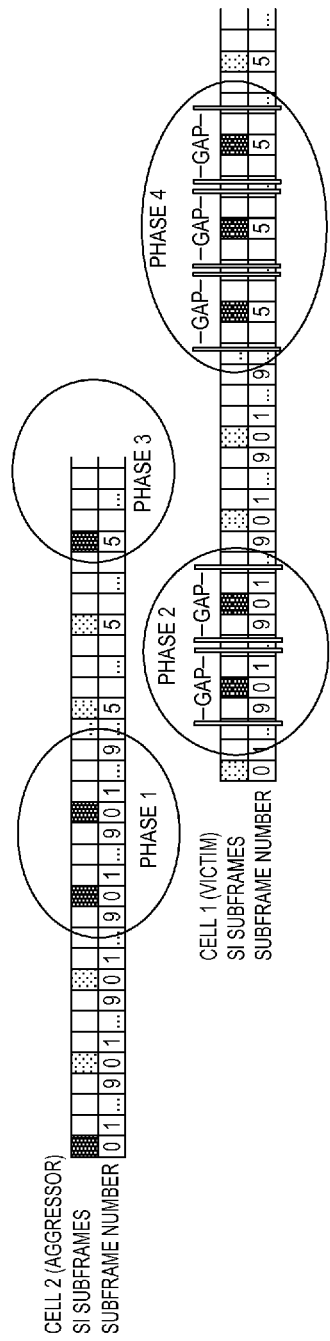
Figure 20:
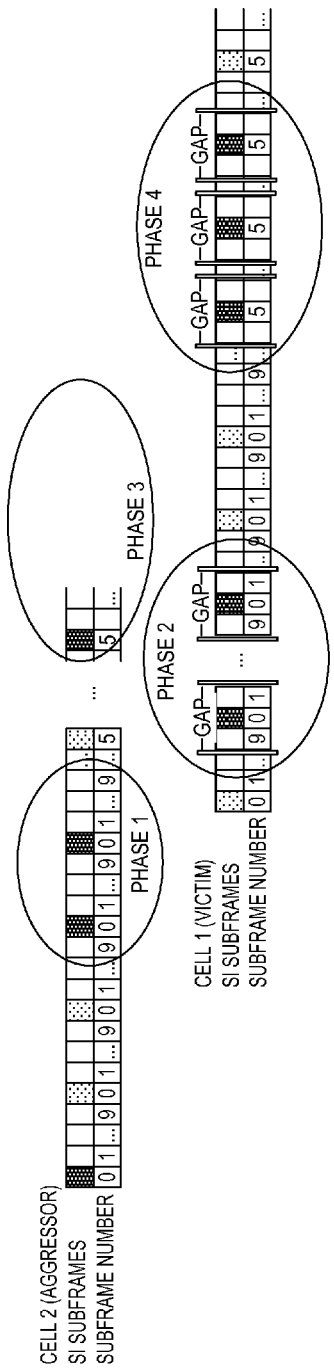
Figure 21:
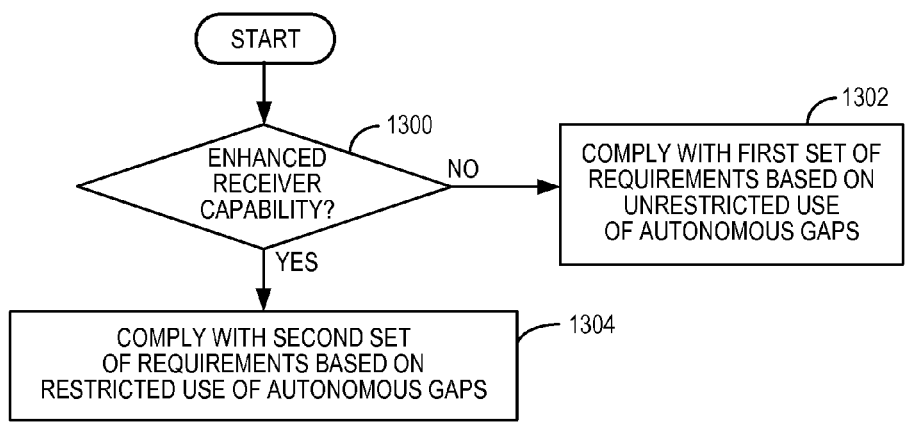
Figure 22:
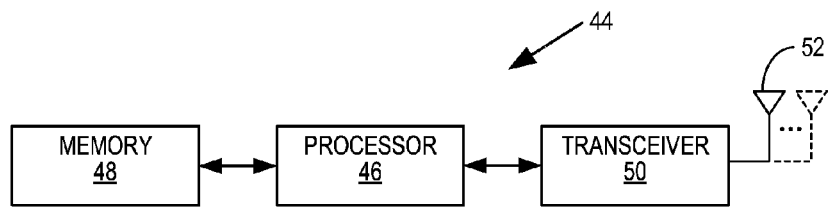
Figure 23:
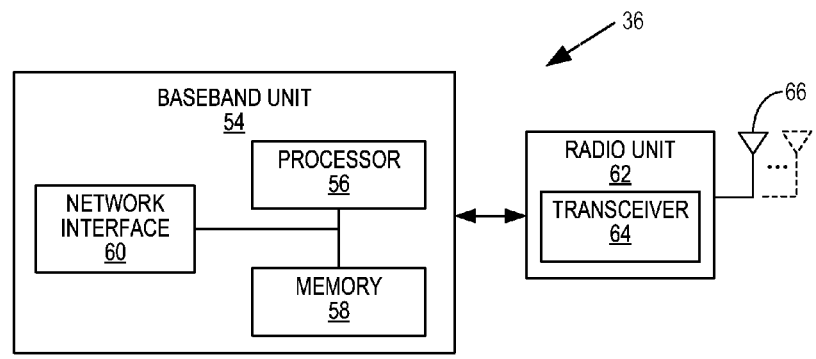
Figure 24:
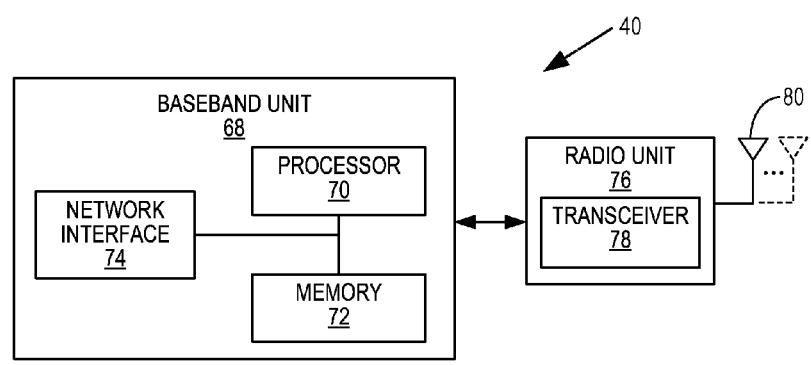

FIG. 8 graphically illustrates one example of the process of FIG. 7 according to one embodiment of the present disclosure;

FIG. 9 illustrates the operation of the wireless device of FIG. 5 according to one embodiment in which the wireless device creates gap(s) for measuring aggressor interference based on configuration information received from a network node;

FIG. 10 is a flow chart that illustrates the operation of the wireless device of FIG. 5 according to another embodiment of the present disclosure in which the wireless device does or does not restrict the use of autonomous gaps depending on whether the wireless device is equipped with an enhanced receiver;

FIG. 11 is a flow chart that illustrates the operation of the wireless device of FIG. 5 according to another embodiment of the present disclosure in which the wireless device restricts the use of autonomous gaps for, e.g., reading the system information of the target cell when enhanced receiver technique(s) are to be used or are likely to be used by the wireless device;

FIG. 12 illustrates an embodiment in which the wireless device of FIG. 5 restricts the use of autonomous gaps based on a measurement configuration (e.g., a measurement pattern) received from a network node;

FIG. 13 illustrates an embodiment in which the wireless device of FIG. 5 restricts the use of autonomous gaps based on an indicator received from a network node;

FIG. 14 illustrates an embodiment in which the wireless device of FIG. 5 restricts the use of autonomous gaps based on both a measurement configuration received from a network node and an indicator received from a network node;

FIG. 15 illustrates an embodiment in which the wireless device of FIG. 5 restricts the use of autonomous gaps based on a complementary configuration that indicates when autonomous gaps are permitted to be used;

FIG. 16 is a flow chart that illustrates the operation of a network node to adapt either operation of the network node, another network node, and/or the wireless device of FIG. 5 to avoid the use of autonomous gaps at the wireless device when using an enhanced receiver of the wireless device according to one embodiment of the present disclosure;

FIG. 17 is a flow chart that illustrates the operation of a network node to adapt its operation to account for usage of gaps for aggressor interference measurements of the wireless device of FIG. 5 according to another embodiment of the present disclosure;

FIG. 18 is a flow chart that illustrates the operation of the wireless device of FIG. 5 to obtain system information of a target cell in a high interference condition using the enhanced receiver of the wireless device according to one embodiment of the present disclosure;

FIG. 19 graphically illustrates one example of the process of FIG. 18;

FIG. 20 illustrates one example of the process of FIG. 18 in which the second aggressor channel (e.g., Physical Downlink Shared Channel (PDSCH) comprising System Information Block 1 (SIB1)) is received in different time resources (e.g., subframes) than the first victim channel (e.g., PBCH);

FIG. 21 is a flow chart that illustrates the operation of the wireless device of FIG. 5 to operate to comply with different sets of requirements depending on whether the wireless device has enhanced receiver capability according to one embodiment of the present disclosure;

FIG. 22 is a block diagram of one embodiment of the wireless device of FIG. 5;

FIG. 23 is a block diagram of one embodiment of the macro base station of FIG. 5; and FIG. 24 is a block diagram of one embodiment of one of the low-power, or small, base stations of FIG. 5.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, a number of terms that are used throughout this disclosure are provided. As used herein, a "radio node" is characterized by its ability to transmit and/or receive radio signals. A radio node includes at least a transmitting or receiving antenna. A radio node may be a wireless device or a radio network node, both of which are defined below.

The terms "wireless device" and User Equipment ("UE") are used interchangeably in this description. As used herein, a "wireless device" represents any device that is equipped with a radio interface and capable of at least transmitting or receiving a radio signal from another radio node. A wireless device may also be capable of receiving signals and demodulating the received signals. The wireless devices described herein may also include certain radio network nodes, e.g., a femto base station (also known as a home base station), that are equipped with a UE-like interface. Example wireless devices include but are not limited to Personal Digital Assistants (PDAs), laptops, mobile telephones, tablet devices, sensors, fixed relays, mobile relays, and any radio network node equipped with a UE-like interface (e.g., a small Radio Base Station (RBS), an Evolved Node B (eNB), or a femto base station). Wireless devices may also represent Machine-to-Machine (M2M)/Machine Type Communication (MTC) devices that have limited communication capabilities, such as a wireless meter or other sensor, a digital billboard, a wireless-capable appliance (e.g., a washing machine or a Digital Video Recorder (DVR)), a Radio Frequency Identifier (RFID) tag, or any other device capable of wireless communication with a radio communications network.

As used herein, a "radio network node" is a radio node included in a radio communications network. A radio network node is capable of receiving radio signals and/or transmitting radio signals in one or more frequencies, and may operate in a single Radio Access Technology (RAT), multi-RAT, or multi-standard mode (e.g., a Multiple Standard Radio (MSR)). A radio network node, including eNB, Remote Radio Head (RRH), Remote Radio Unit (RRU), or transmitting-only/receiving-only radio network nodes, may or may not create its own cell. Some examples of radio network nodes not creating their own cells are beacon devices transmitting configured radio signals or measuring nodes receiving and performing measurements on certain signals (e.g., Location Measurement Units (LMUs)). A radio network node may also share a cell or a used cell Identifier (ID) with another radio node that does create its own cell. A radio network node may operate in a cell sector or may be associated with a radio network node creating its own cell. More than one cell or cell sectors (commonly named in the described embodiments by a generalized term "cell" which may be understood as a cell or its logical or geographical part) may be associated with one radio network node. Further, one or more serving cells (in downlink and/or uplink) may be configured for a UE, e.g., in a carrier aggregation system where a UE may have one Primary Cell (pCell) and one or more Secondary Cells (sCells). A cell may also be a virtual cell (e.g., characterized by a cell ID but not provide a full cell-like service) associated with a transmit node.

As used herein, a "network node" is any radio network node or a core network node. Some non-limiting examples of a network node are an eNB (also radio network node), a Radio Network Controller (RNC), a positioning node, a Mobility Management Entity (MME), a Public Safety Answering Point (PSAP), a Self Organizing Network (SON) node, a Minimization of Drive Tests (MDT) node, a coordinating node, a gateway node (e.g., a Packet Data Network (PDN) Gateway (P-GW), a Serving Gateway (S-GW), a LMU gateway, or a femto gateway), and an Operations and Management (O&M) node.

As used herein, a "coordinating node" is a network and/or node that coordinates radio resources with one or more radio nodes. Some examples of the coordinating node are a network monitoring and configuration node, an Operations Support System (OSS) node, a O&M node, a MDT node, a SON node, a positioning node, an MME, a gateway node such as a P-GW, a S-GW, or a femto gateway node, a macro node coordinating smaller radio nodes associated with it, eNB coordinating resources with other eNBs, etc.

As used herein, the term "subframe" (typically related to LTE) is an example resource in the time domain, and in general it may be any predefined time instance or time period.

As used herein, an "enhanced receiver" is a receiver implementing an enhanced receiver technique(s) (e.g., interference cancellation, interference suppression, interference rejection, etc.). In some embodiments, "receiver type" may be used interchangeably with "receiver technique." In one example, interference mitigation, e.g., cancellation, may be performed in a forward or reverse manner, e.g., in the next time instance(s) after decoding the aggressor channel and/or in the time instance(s) preceding the time instance when the aggressor channel was decoded (using the stored received signals).

As used herein, the term "victim" may apply e.g. to a measured signal/channel or a measured cell depending on the context, the measurements of which are performed in high interference conditions.

As used herein, the term "aggressor" may apply e.g. to a strongly interfering signal/channel or a strongly interfering radio node (e.g., a wireless device or a radio network node), antenna, or cell, depending on the context, that causes interference to the victim signal/channel/node/antenna/cell. In a cellular communications network, the interference may be e.g. intra-cell or inter-cell but may also be from device-to-device communication. An aggressor signal/channel may be transmitted by the same node or a different node than that transmitting a victim signal/channel (e.g., a cell of the same eNB or a cell of a different eNB; an intra-cell interfering signal is transmitted in the same cell by a different UE or by the same eNB using a different signal characteristic).

Some examples of victim-aggressor relations include, but are not limited to: an LTE physical signal to an LTE physical signal (of the same or different type) or to an LTE physical channel, an LTE physical channel to an LTE physical channel (of the same or different type), or an LTE physical signal, a macro cell or its UE interfering to a pico cell or the pico UE, a femto cell or a Closed Subscriber Group (CSG) UE interfering to a non-CSG cell or non-CSG UE, etc.

For purposes of this description, "autonomous gaps" may refer to one or more of: intra-frequency autonomous gaps, inter-frequency autonomous gaps, inter-RAT autonomous gaps, or inter-band autonomous gaps (e.g., when the transmission of the aggressor signal/channel overlaps with the measurement/channel reception bandwidth, which may or may not be an intra-frequency scenario, e.g., depending on whether the center frequencies are aligned or not).

As used herein, a received "signal" may be one or more of: a physical signal, a reference signal, a physical channel, a logical channel, etc.

The signaling described herein may be via direct links or via logical links (e.g. via higher layer protocols and/or via one or more network and/or radio nodes or other indirect links. For example, signaling from a coordinating node to a UE may also pass another network node, e.g., a radio network node.

Further, while LTE terminology is sometimes used in the description below, the described embodiments are not limited to LTE, but may be applied with any Radio Access Network (RAN), single- or multi-RAT. Some other RAT examples are LTE-Advanced, Universal Mobile Telecommunications System (UMTS), High Speed Packet Access (HSPA), Global System for Mobile Communications (GSM), Code Division Multiple Access 2000 (CDMA2000), WiMAX, and WiFi. Still further, the embodiments described herein may also be applied to multi-point transmission and/or reception systems, carrier aggregation systems, and multi-point carrier aggregation systems.

With the current Third Generation Partnership Project (3GPP) LTE standards, when a UE having an enhanced receiver configures gaps, e.g., autonomous gaps, for performing intra-frequency measurements on a target cell, it is not clear as to how the enhanced receiver is to be used, particularly when the enhanced receiver implies simultaneous measurements. For certain systems, this may result in one or more of the following problems. Note that these problems are given only as examples and are not intended to limit the scope of the present disclosure.

One problem is that, in the presence of higher interference, it is natural to estimate the interference at the same time instance when the interference needs to be mitigated. However, simultaneous channel reception adds complexity at the UE in the form of additional memory and processing requirements. Also, handling interference from a physical channel with unknown payload is more difficult than handling interference from a known physical signal (e.g., a Cell-specific Reference Signal (CRS)), since this may also involve decoding.

Figure 1:
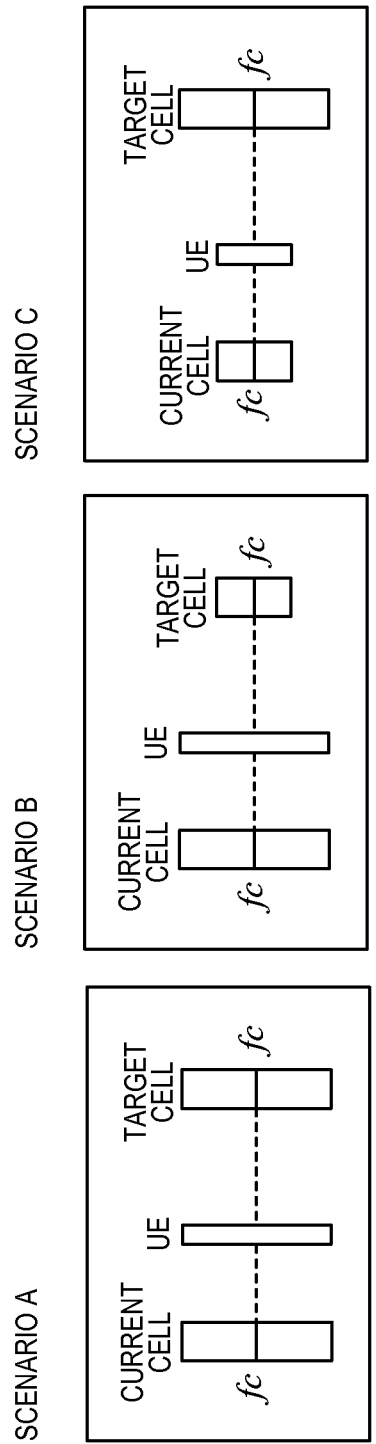
FIG. 1 illustrates transmission bandwidths for a User Equipment device (UE), a current or serving cell of the UE, and a target cell for which the UE performs intra-frequency measurements for three different scenarios.
Figure 2:
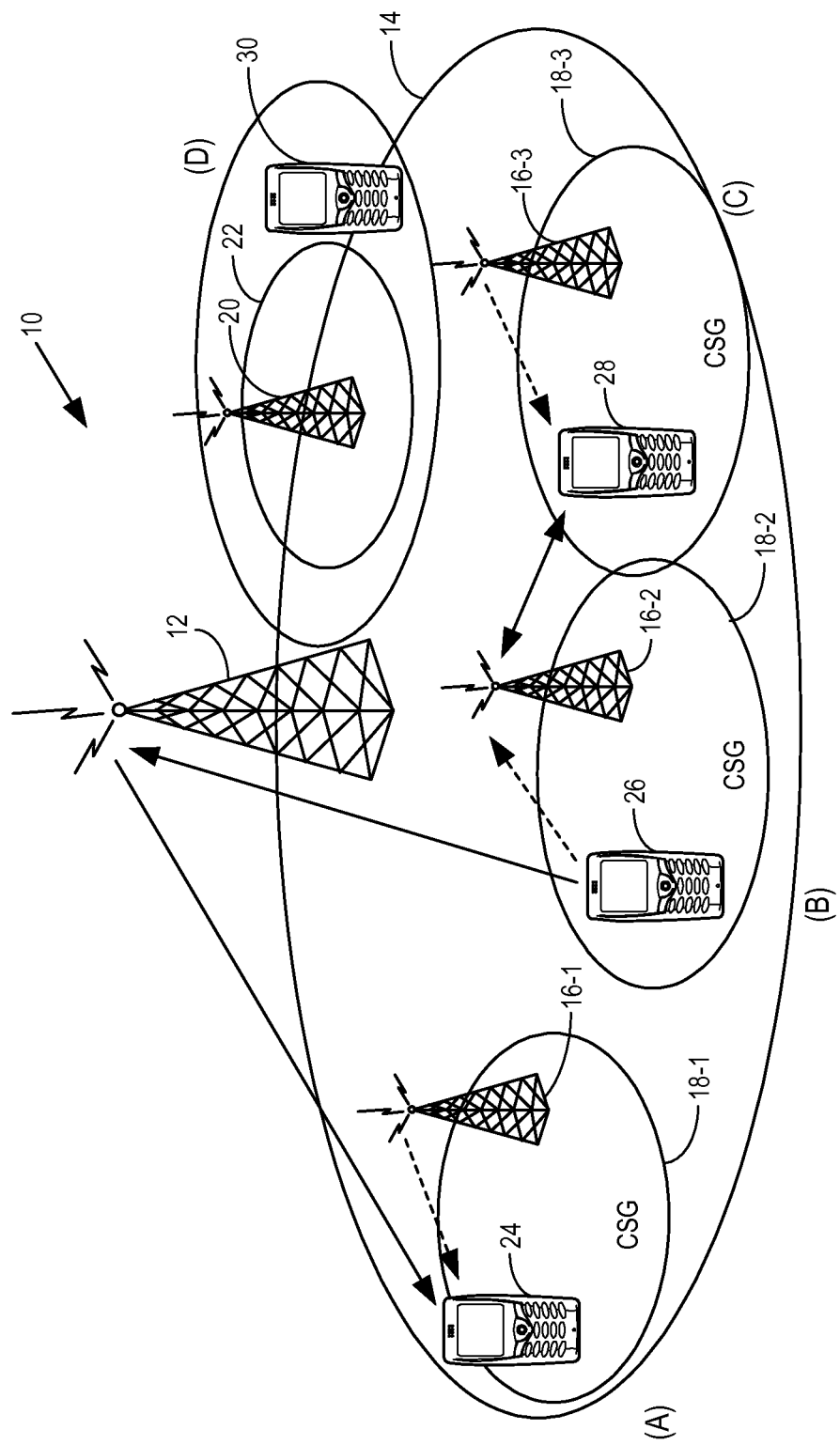
FIG. 2 illustrates several interference scenarios in one example of a heterogeneous cellular communications network.
Figure 4:
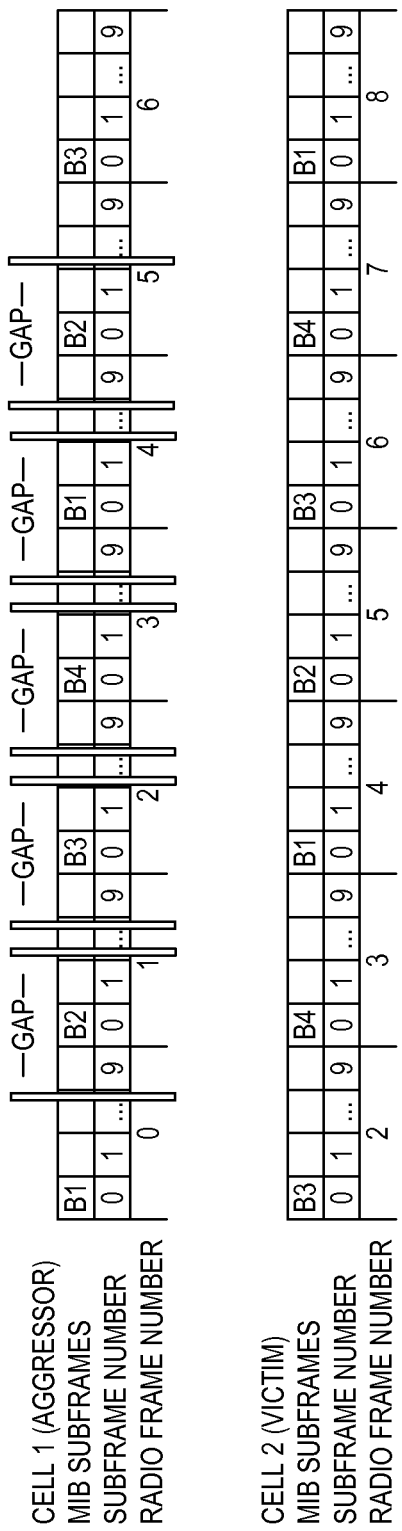
FIG. 4 illustrates PBCH transmissions in a victim cell and an aggressor cell with autonomous gaps for reading the Master Information Block (MIB) of the aggressor cell.

Another problem is that a UE using gaps for reading a channel of another cell, even on the same frequency, is not able to measure a victim channel while reading an aggressor channel and hence is not able to cancel the interference caused by the aggressor channel (or apply at least some enhanced receiver technique(s)) at the same time instance at which the UE is reading the aggressor channel. The aggressor and victim channels/signals may be of the same type. For example, FIG. 4 illustrates Physical Broadcast Channel (PBCH) transmissions in a victim cell and an aggressor cell with autonomous gaps for reading the Master Information Block (MIB) of the aggressor cell. In this case, the PBCH of the aggressor cell (cell 1) causes interference to the PBCH of the victim cell due to aligned boundaries of the radio frames of the two cells. Note that the example of FIG. 4 is for PBCH, but the problem is not limited to PBCH only. Alternatively, the victim and aggressor channels/signals may be of different types (e.g., when the network has shifted radio frames to avoid PBCH-to-PBCH interference, the PBCH of the aggressor cell may cause interference to the Physical Downlink Shared Channel (PDSCH) of the victim cell).

Another problem is that there may be multiple aggressor cells. So, if, for example, there are two aggressor cells, the UE may have to read up to three cells at the same time (i.e., one victim cell and two aggressor cells).

Yet another problem is that the cellular communications network is not aware of when a UE is configuring autonomous gaps. During autonomous gaps the UE cannot perform measurements on the victim cell and neither can the UE transmit in the uplink. Since the cellular communications network is not aware of when a UE is configuring autonomous gaps, the cellular communications network may schedule transmissions for the victim cell during autonomous gaps, which may result in performance degradation, e.g., due to inability of simultaneous channel reception at the UE.

Another problem is that the cellular communications network may request measurements or reports (e.g., Cell Global Identifier (CGI) reading and reporting) from a UE while an enhanced receiver technique is being used. According to the current LTE standard, the UE is allowed to use autonomous gaps for the requested CGI reading. The use of autonomous gaps while an enhanced receiver technique is also being used means that performance of the enhanced receiver technique may be degraded during that time.

Yet another problem is that an interfering channel may cause interference to signals or channels that do not need to be read very often, e.g., may cause interference to the PBCH of a victim cell, but in other cases an interfering channel may cause interference to channels that need to always be read (e.g., data channels) or that need to be read relatively often (e.g., some broadcast data which changes relatively frequently).

In light of the discussion above, there is a need for systems and methods that enable the use of both enhanced receiver techniques and gaps, e.g., autonomous gaps for intra-frequency measurements, without requiring simultaneous reception of signals/channels from multiple cells and without degrading the performance of the enhanced receiver techniques. In this regard, FIG. 5 illustrates one example of a heterogeneous deployment of a cellular communications network 34 (hereinafter heterogeneous cellular communications network 34) in which embodiments of the present disclosure may be implemented. As illustrated, the heterogeneous cellular communications network 34 includes a macro base station 36 (e.g., an eNB) serving a corresponding macro cell 38 and a number of small, or low-power, base stations 40-1 and 40-2 (e.g., femto or home eNB) serving corresponding small cells 42-1 and 42-2.

In this embodiment, a wireless device 44 is served by the small base station 40-1 (i.e., the small cell 42-1 is a serving cell of the wireless device 44). The wireless device 44 is equipped with an enhanced receiver that operates to perform one or more enhanced receiver techniques to mitigate or cancel interference (e.g., intra-frequency interference) caused by transmission of a signal (e.g., a physical or logical signal or a physical or logical channel) by an aggressor cell. In this example, the small cell 42-1 is a CSG cell to which the wireless device 44 does not have access. As such, the small cell 42-1 is an aggressor cell with respect to the wireless device 44 in that downlink transmissions by the small base station 40-1 for the small cell 42-1 cause interference to the wireless device 44. As such, during downlink reception for the macro cell 38, which in this example is the victim cell, the wireless device 44 uses one or more enhanced receiver techniques to mitigate interference caused by downlink transmissions from the small base station 40-1 for the small cell 42-1.

As discussed below, in some embodiments, the wireless device 44 creates one or more gaps in downlink reception and/or uplink transmission for the macro cell 38 (which is the serving and victim cell of the wireless device 44) to measure interference from the aggressor cell, which in this example is the small cell 42-1. Resulting interference measurement(s) are then utilized to mitigate the interference from the aggressor cell during reception of a signal from the macro cell 38 using one or more enhanced receiver techniques. In this manner, the need for simultaneous reception from both the serving/victim cell and the aggressor cell is avoided, which in turn reduces the complexity of the wireless device 44.

Further, in some embodiments, the wireless device 44 creates one or more gaps in downlink reception and/or uplink transmission for the macro cell 38 to, e.g., read system information of the small cell 42-2. In this regard, the small cell 42-2 is referred to as a target cell of the wireless device 44. As discussed below, in some embodiments, the use of gaps by the wireless device 44 to, e.g., read the system information of the small cell 42-2 (i.e., the target cell) is restricted when using enhanced receiver technique(s). In this manner, degradation in the performance of the enhanced receiver technique(s) due to such gaps, which may prevent interference measurements during the gaps, can be avoided.

Still further, in some embodiments, the macro base station 36 operates to determine that the wireless device 44 has enhanced receiver capability (i.e., is equipped with an enhanced receiver that is capable of performing one or more enhanced receiver techniques). In response, the macro base station 36 adapts transmission scheduling for the wireless device 44, measurement configuration for the wireless device 44, and/or reception configuration for the wireless device 44 according to expected usage of autonomous gaps by wireless devices, such as the wireless device 44, having an enhanced receiver capability for interference measurement. Note that the macro base station 36 is just one example of a network node that can be used to adapt operation based on expected usage of autonomous gaps by wireless devices having an enhanced receiver capability for interference measurement. Other network nodes may similarly operate to adapt operation in response to determining that the wireless device 44 has enhanced receiver capability.

Figure 6:
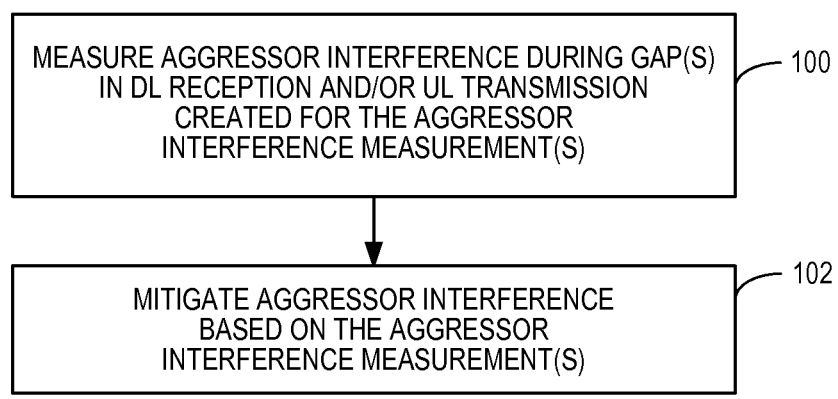
FIG. 6 is a flow chart that illustrates the operation of the wireless device of FIG. 5 according to one embodiment of the present disclosure.

FIG. 6 is a flow chart that illustrates the operation of the wireless device 44 according to one embodiment of the present disclosure. Note however that the functionality of the wireless device 44 described herein may implemented in other types of radio nodes having enhanced receiver capability (i.e., is not limited to the wireless device 44). As illustrated, the wireless device 44 measures aggressor interference (i.e., interference caused, or generated, by transmissions from the aggressor cell) during one or more gaps in downlink reception and/or uplink transmission for the serving cell of the wireless device 44 to thereby obtain one or more interference measurements (step 100). The aggressor interference is, in one embodiment, intra-frequency interference (i.e., the interference measurement(s) are intra-frequency measurements), in which case the one or more gaps are one or more intra-frequency gaps. However, the present disclosure is not limited thereto. The aggressor interference may alternatively be inter-frequency or inter-RAT interference, in which case the one or more gaps are one or more inter-frequency or inter-RAT gaps (e.g., when the bandwidth of the aggressor interference overlaps, fully or in part, with the bandwidth of the victim cell). Still further, the aggressor interference may be interference caused, or generated, by transmission of an aggressor, or interfering, signal (e.g., a physical signal, a logical signal, a physical channel, a logical channel, etc.) from the aggressor cell. In one embodiment, the aggressor signal is an aggressor channel. In one particular embodiment, the aggressor signal is one or more physical channels including system information, e.g., MIB, System Information Block 1 (SIB1), or other System Information Block(s) (SIBs).

In this embodiment, the gap(s) in downlink reception and/or uplink transmission for the serving cell are created to measure the aggressor interference. As such, the gap(s) are to be distinguished from conventional autonomous gaps that may be created by a wireless device, e.g., the wireless device 44, to read system information of a target cell. Further, the gap(s) may be autonomous gap(s) created by the wireless device 44 or gap(s) created based on configuration information from the heterogeneous cellular communications network 34 (e.g., from the macro base station 36). As discussed below, the configuration information may be, e.g., gap configuration information that is indicative of when gaps are or are not permitted, a time domain pattern that is indicative of time instances in which gaps are or are not permitted, or the like. By using the gap(s) to perform the interference measurement(s), the wireless device 44 avoids the need for simultaneous reception of the aggressor cell and the serving cell in the same time instance. Note that the aggressor interference is interference caused by transmission of a signal (i.e., a physical signal, a logical signal, a physical channel, a logical channel, etc.) from the aggressor cell.

It should be noted that when gap(s) are used for measuring the aggressor interference, the wireless device 44 may read or measure a signal(s) from another cell (e.g., the serving or victim cell) in time and/or frequency resources other than those in which the aggressor interference is measured. This may be done when the aggressor interference is caused by a physical channel(s) that spans less than all time and/or frequency resources within the gap(s). For example, if the aggressor interference is interference caused by transmission of PBCH from the aggressor cell, the wireless device 44 may measure the aggressor interference during time and frequency resources within the gap(s) in which the PBCH is transmitted from the aggressor cell and read or measure other channels (e.g., data channel(s)) transmitted by the serving cell during time and frequency resources within the gap(s) in which the aggressor interference is not measured. However, in another embodiment, the gap(s) may be defined to only include those time and frequency resources in which the aggressor interference is to be measured. The gaps are typically not needed for measurements and channel reading on the serving cell.

Next, the wireless device 44, and in particular the enhanced receiver of the wireless device 44, mitigates the aggressor interference during reception or measurement of a signal from a victim cell (which in the example of FIG. 5 is the serving cell) based on the interference measurement(s) using one or more enhanced receiver techniques (step 102). The signal from the victim cell is referred to herein as a victim signal. The victim signal may be a same type of signal as the signal causing the aggressor interference (e.g., both the victim signal and the aggressor signal are PBCHs) or a different type of signal as the signal causing the aggressor interference. As discussed below, in one embodiment, the gap(s) used for the interference measurement(s) occur before reception of the signal from the victim cell such that the aggressor interference is mitigated while the signal is being received. However, in another embodiment, the gap(s) used for the interference measurement(s) occur after reception of the signal from the victim cell. In this case, the signal received from the victim cell is stored and the one or more enhanced receiver techniques are subsequently applied to the stored signal based on the interference measurement(s).

In one embodiment, a total time for performing reception of the victim signal may be extended to account for the gap(s) created for measuring the aggressor interference. In another embodiment, a total time for performing reception of the victim signal may exclude the time used for the gap(s) for measuring the aggressor interference.

In one embodiment, the aggressor interference may be measured and the victim signal may be received in sequential or overlapping time intervals. This may be particularly beneficial where the aggressor interference is caused by more than Redundancy Versions (RVs), or retransmissions, of an aggressor signal (e.g., an aggressor channel) and/or more than transmission (e.g., more than one transmissions of a channel). For example, redundancy versions of PBCH may be transmitted every 10 microseconds (ms), and PBCH may be transmitted every 40 ms. In this regard, FIG. 7 is a flow chart that illustrates the operation of the wireless device 44 to measure aggressor interference during a first time period and mitigate the aggressor interference during a second time period according to one embodiment of the present disclosure. As illustrated, the wireless device 44 measures an aggressor interference from an aggressor cell using one or more gaps created in downlink reception and/or uplink transmission for a victim cell during a first time period to thereby obtain interference measurement(s) (step 200). The wireless device 44 then mitigates the aggressor interference during a reception or measurement of a victim signal from the victim cell during a second time period based on the interference measurement(s) using one or more enhanced receiver techniques (step 202). In one embodiment, the first and second time periods do not overlap and, in one particular embodiment, the first time period precedes the second time period. In another embodiment, the first and second time periods partially overlap.

FIG. 8 graphically illustrates one example of the process of FIG. 7 according to one embodiment of the present disclosure. In this example, the wireless device 44 measures, or estimates, the aggressor interference caused by transmission of a channel (e.g., PBCH) by the aggressor cell using two gaps in downlink reception from the victim cell during a first time period (Phase 1). The wireless device 44 then mitigates the aggressor interference caused by transmission of the channel (e.g., PBCH) by the aggressor cell during reception of the same channel (e.g., PBCH) from the victim cell during a second time period (Phase 2) based on the interference measurements from the first time period (Phase 1).

As discussed above, the gap(s) used to perform the aggressor interference measurement(s) may be autonomously created by the wireless device 44 or created by the wireless device 44 based on configuration information received from a network node of the heterogeneous cellular communications network 34. In this regard, FIG. 9 illustrates the operation of the wireless device 44 according to one embodiment in which the wireless device 44 creates gap(s) for measuring aggressor interference based on configuration information received from the macro base station 36, which is the serving base station of the wireless device 44. As illustrated, the wireless device 44 receives gap configuration information from the macro base station 36 (step 300). In one embodiment, the gap configuration information includes information that is indicative of time and/or frequency resources that may be used for gaps and/or information that is indicative of time and/or frequency resources that may not be used for gaps. In another embodiment, the gap configuration information includes a pattern that is indicative of time and/or frequency resources that are permitted to be used for gaps and/or a pattern that is indicative of time and/or frequency resources that are not permitted to be used for gaps.

The wireless device 44 then configures one or more gaps during downlink reception and/or uplink transmission for a victim cell (e.g., the serving cell) for one or more aggressor interference measurements based on the gap configuration information (step 302). More specifically, if the gap configuration is indicative of time and/or frequency resources in which gaps are permitted or if the gap configuration information defines a pattern that is indicative of time and/or frequency resources in which gaps are permitted, the wireless device 44 configures the one or more gaps in time and/or frequency resources in which gaps are permitted. Conversely, if the gap configuration is indicative of time and/or frequency resources in which gaps are not permitted or if the gap configuration information defines a pattern that is indicative of time and/or frequency resources in which gaps are not permitted, the wireless device 44 configures the one or more gaps in time and/or frequency resources other than those in which gaps are not permitted. The wireless device 44 then measures the aggressor interference in the gap(s) and mitigates the aggressor interference based on the resulting aggressor interference measurement(s), as described above (steps 304 and 306).

In the embodiments described above, the wireless device 44 utilizes one or more gaps to measure the aggressor interference. In other embodiments of the present disclosure, the wireless device 44 operates to restrict the use of autonomous gaps to, e.g., read system information of the target cell. These autonomous gaps used to, e.g., read system information are to be distinguished from gaps used to measure aggressor interference. By restricting the use of autonomous gaps, degradation of enhanced receiver performance resulting from the use of autonomous gaps is avoided.

In this regard, FIG. 10 is a flow chart that illustrates the operation of the wireless device 44 according to another embodiment of the present disclosure in which the wireless device 44 does or does not restrict the use of autonomous gaps depending on whether the wireless device 44 is equipped with an enhanced receiver. As illustrated, the wireless device 44 determines whether the wireless device 44 is equipped with an enhanced receiver (step 400). If so, the wireless device 44 restricts the use of autonomous gaps in time and/or frequency resources in which one or more enhanced receiver techniques are used to mitigate aggressor interference (step 402). In other words, the wireless device 44 does not permit the use of autonomous gaps to, e.g., read the system information of the target cell during time and/or frequency resources in which enhanced receiver technique(s) are used to mitigate aggressor interference. If the wireless device 44 is not equipped with an enhanced receiver, the wireless device 44 permits use of autonomous gaps (i.e., does not restrict the use of autonomous gaps (step 404).

FIG. 11 is a flow chart that illustrates the operation of the wireless device 44 according to another embodiment of the present disclosure in which the wireless device 44 restricts the use of autonomous gaps to, e.g., read the system information of the target cell when the enhanced receiver technique(s) are to be used or are likely to be used. More specifically, the wireless device 44 determines whether the wireless device 44 is equipped with an enhanced receiver (step 500). Note that step 500 is optional. For example, in another embodiment, the wireless device 44 may be known or assumed to have an enhanced receiver. The wireless device 44 determines whether the wireless device 44 is experiencing or is expected to experience a high interference level (step 502). The wireless device 44 may determine that the interference level is high when, for example, one or more of the following conditions exist (and conversely that the interference level is low if one or more of the following conditions do not exist):

the signal quality for the serving cell is below a threshold,
the interfering signal from the aggressor cell is above a threshold,
the received total interference is above a threshold,
The predicted signal quality for the serving cell is low, e.g., predicted based on CRS or synchronization signal estimates (time alignment between aggressor and victim cell may also be taken into account),
the wireless device 44 is configured with a measurement pattern to enable measurements in high interference conditions, and
the wireless device 44 is provided with assistance data for handling high interference (e.g., CRS assistance data).

If there is a high interference level, the wireless device 44 restricts the use of autonomous gaps to, e.g., read the system information of the target cell during time and/or frequency resources in which enhanced receiver technique(s) are used to mitigate the aggressor interference (step 504). Otherwise, the wireless device 44 permits the use of autonomous gaps (i.e., does not restrict the use of autonomous gaps) (step 506). Note that while in this embodiment the wireless device 44 determines whether to restrict the use of autonomous gaps based on interference level, the wireless device 44 may additionally or alternatively consider a channel type of the victim channel. For example, in one embodiment, when interference is high on PBCH, the wireless device 44 may not use autonomous gaps for receiving aggressor and/or victim PBCH (depending on which is cell is the serving cell). This may also depend on whether the wireless device 44 is capable of using an enhanced receiver (e.g., PBCH Interference Cancellation (IC)) or not, e.g., the wireless device 44 will not use autonomous gaps if it is capable and intends to use the enhanced receiver. This may also depend on a timing relation between the aggressor and victim cells (e.g., System Frame Number (SFN) offset at the transmitter or time misalignment at the receiver). In contrast, when interference is low on PBCH, the wireless device 44 may use autonomous gaps when receiving a channel from a non-serving cell (e.g., the target cell).

The adaptation described above with respect to FIG. 11 may be for a specific frequency, RAT, or band (e.g., only for intra-frequency gaps, only for inter-frequency bands, or only for inter-RAT gaps). Further, the adaptation may also be specific for a channel, e.g., it may be used for a broadcast channel or a channel including system information. Also, the gaps may also be network-configured gaps for receiving channels (receiving a channel may comprise a decoding operation), gaps autonomously configured by the wireless device 44, or a combination thereof.

FIGS. 12-15 illustrate embodiments in which the wireless device 44 restricts the use of autonomous gaps based on information and/or an indicator received from a network node (e.g., the macro base station 36) of the heterogeneous cellular communications network 34. Note that there may also be a predefined rule(s) that define a subset of time and/or frequency resources in which the wireless device 44 may create autonomous gaps. More specifically, FIG. 12 illustrates an embodiment in which the wireless device 44 restricts the use of autonomous gaps based on a measurement configuration (e.g., a measurement pattern) received from the macro base station 36. As illustrated, the wireless device 44 receives the measurement configuration from the macro base station 36 (step 600). The measurement configuration indicates time and/or frequency resources for measurements. In general, these measurements may be any measurements or channel reading. Some examples are reading system information, RRM measurements, positioning measurements, SON measurements, etc. In one example, the measurement configuration is a measurement pattern, e.g., a time domain measurement resource restriction pattern. The wireless device 44 then restricts use of autonomous gaps to e.g., read the system information of the target cell in the time and/or frequency resources indicated for measurements by the measurement configuration (step 602). Note that, in one embodiment, the wireless device 44 may restrict use of all gaps (e.g., both autonomous gaps and network-controlled gaps) in the time and/or frequency resources indicated for measurements by the measurement configuration. In one embodiment, if the enhanced receiver of the wireless device 44 is used for receiving a victim signal (e.g., a victim channel), the enhanced receiver should be capable of receiving the victim signal and an aggressor signal without gaps, if they are transmitted in the resources indicated by the pattern.

FIG. 13 illustrates an embodiment in which the wireless device 44 restricts the use of autonomous gaps based on an indicator received from the macro base station 36. As illustrated, the wireless device 44 receives the indicator from the macro base station 36 (step 700). The indicator indicates whether the wireless device 44 is allowed to create autonomous gaps (e.g., autonomous gaps to, e.g., read the system information of the target cell) when the enhanced receiver of the wireless device 44 is used to perform reception or measurement of a victim signal (e.g., a victim channel). The wireless device 44 then restricts use of autonomous gaps to, e.g., read the system information of the target cell according to the indicator (step 702). Note that, in one embodiment, the wireless device 44 may restrict the use of all gaps according to the indicator. If the indicator indicates that the use of autonomous gaps is to be restricted, then the wireless device 44 restricts the use of autonomous gaps accordingly. Otherwise, the wireless device 44 does not restrict the use of autonomous gaps.

FIG. 14 illustrates an embodiment in which the wireless device 44 restricts the use of autonomous gaps based on both the measurement configuration of FIG. 12 and the indicator of FIG. 13. As illustrated, the wireless device 44 receives the measurement configuration from the macro base station 36 (step 800). The measurement configuration indicates time and/or frequency resources for measurements. In general, these measurements may be any measurements or channel reading. Some examples are reading system information, RRM measurements, positioning measurements, SON measurements, etc. In one example, the measurement configuration is a measurement pattern, e.g., a time domain measurement resource restriction pattern. The wireless device 44 also receives the indicator from the macro base station 36 (step 802). In this embodiment, the indicator indicates whether the wireless device 44 is allowed to create autonomous gaps (e.g., autonomous gaps to, e.g., read the system information of the target cell) when the enhanced receiver of the wireless device 44 is used to perform reception or measurement of a victim signal (e.g., a victim channel) in time and/or frequency resources other than those indicated by the measurement configuration. The wireless device 44 then restricts use of autonomous gaps according to both the measurement configuration and the indicator (step 804).

FIG. 15 illustrates an embodiment in which the wireless device 44 restricts the use of autonomous gaps based on a complementary configuration that indicates when autonomous gaps are permitted to be used. As illustrated, the wireless device 44 receives a complementary configuration from the macro base station 36 (step 900). The complementary configuration indicates time and/or frequency resources when autonomous gaps to, e.g., read the system information of the target cell are permitted when the enhanced receiver is used. In one example, the complementary configuration is a complementary pattern indicative of time and/or frequency resources in which the wireless device 44 is permitted to create autonomous gaps when the enhanced receiver is used. The wireless device 44 then restricts use of autonomous gaps according to the complementary configuration (step 902).

In some of the embodiments above, the wireless device 44 adapts its operation by restricting the use of autonomous gaps. FIG. 16 is a flow chart that illustrates the operation of a network node to adapt either operation of the network node, another network node, and/or the wireless device 44 to avoid the use of autonomous gaps at the wireless device 44 when using the enhanced receiver according to one embodiment of the present disclosure. In this embodiment, the network node is the macro base station 36. However, this embodiment is not limited thereto. As illustrated, the macro base station 36 determines whether the wireless device 44 has enhanced receiver capability (step 1000). If not, the process ends. Otherwise, the macro base station 36 adapts transmission scheduling, measurement configuration, and/or reception configuration for the wireless device 44 according to expected usage of autonomous gaps at wireless devices, such as the wireless device 44, having enhanced receiver capability for interference measurement (step 1002).

More specifically, in one embodiment, the macro base station 36 adapts transmission scheduling for the wireless device 44 such that transmissions to the wireless device 44 from the macro cell 38 avoid resources during which autonomous gaps are expected to be used by the wireless device 44 for interference measurement. In one embodiment, the macro base station 36 adapts the measurement configuration for the wireless device 44 such that measurements by the wireless device 44 for cells other than the serving/victim cell during resources in which the wireless device 44 is expected to use an enhanced receiver technique are avoided. In one embodiment, the macro base station 36 adapts the reception configuration for the wireless device 44 such that autonomous gaps for reception of one or more channels containing system information from a target cell are avoided during resources during which the wireless device 44 is expected to measure interference for an enhanced receiver technique. In another embodiment, the macro base station 36 avoids measurement requests for the wireless device 44 that would require autonomous gaps for reception of one or more channels containing system information from a target cell during resources during which the wireless device 44 is expected to measure interference for an enhanced receiver technique.

FIG. 17 is a flow chart that illustrates the operation of a network node to adapt its operation to account for usage of gaps for aggressor interference measurements of the wireless device according to another embodiment of the present disclosure. In this example, the network node is the macro base station 36. However, this embodiment is not limited thereto. As illustrated, the macro base station 36 determines the aggressor interference (step 1100). More specifically, the base station 36 determines the interfering signals (interfering physical signals, interfering logical signals, interfering physical channels, interfering logical channels, etc.) and time and/or frequency resources when the interfering signals are transmitted by the aggressor cell(s) and/or received by the wireless device 44. For example, the wireless device 44 may determine the interference based on one or more of:

the data indicating usage of the gaps (see also step 1102),
neighbor cell information,
data obtained via O&M (e.g., neighbor cell scheduling configuration, inter-cell time alignment, etc.),
measurements from one or more wireless devices, and
predefined rule or a standard (e.g., most of the channels have a set of predetermined transmission configurations; the set of interfering channels may be known once the inter-cell time alignment information is available).

The macro base station 36 also determines usage of gaps and/or the gap pattern for intra-frequency measurements by one or more wireless devices 44 (step 1102). The macro base station 36 makes this determination based on, for example, one or more of:

wireless device 44 category or release,
receiving wireless device's 44 capability associated with simultaneous channel reception,
obtaining an indication of using gaps for intra-frequency measurements or the gap configuration (e.g., receiving from a wireless device 44 or a network node or obtaining from an internal function configuring the network-configured gaps),
determining based on the uplink transmissions from the wireless device 44 (e.g., serving eNB may schedule Sounding Reference Signal (SRS) transmissions and monitor to determine when the wireless device 44 seize transmitting the SRS),
determining based on monitoring the feedback transmitted by the wireless device 44, e.g.:
the wireless device 44 may be expected to transmit the feedback at a certain time but not transmitting the feedback in practice due to usage of the gaps at the time occasions when the feedback should be transmitted—determining time occasions when such feedback are not received will indicate when the wireless device 44 is using autonomous gaps, and the wireless device 44 may report a failure or feedback indicative of downlink channels were not received at certain times which may also be due to the fact that the wireless device 44 is using the gaps, if no other information available, then, in one example, it may be assumed that a wireless device 44 may use gaps.

The macro base station 36 also determines receiver capability related to mitigating interference (step 1104). The base station 36 then adapts transmission scheduling and/or measurement/channel reception configuration decisions using at least the information about gap usage and interferers, e.g., one or more of:

avoid scheduling of transmissions of channels in time and/or frequency resources where receiving the channels may be challenging for the wireless device 44, avoid configuring measurements/channel receptions in time and/or frequency resources where receiving the channels may be challenging for the wireless device 44, adapt the scheduling, based on the receiver type information, use a subset of transmission configurations which enable receiving the channels by the wireless device 44 (e.g., use a limited subset of Modulation and Coding Schemes (MCSs)), configure gaps for intra-frequency measurements for the wireless device 44 to avoid or reduce performance degradation of scheduled transmissions, and avoid measurement requests that require gaps for intra-frequency measurements/channel reception, e.g., adapt requesting of CGI, e.g. delay the requesting or allow for longer measurement time/delayed report triggered by the request.

Optionally, the macro base station 36 signals a complementary pattern indicative of time and/or frequency resources in which the wireless device 44 is allowed to create autonomous gaps when an enhanced receiver is used for performing measurement and/or a complementary pattern indicative of time and/or frequency resources in which the wireless device 44 is allowed to create gaps for measuring interference (step 1108). The macro base station 36 may signal one or multiple complementary patterns for the same type of measurement or different types of measurements or for different set of aggressor cells. For example the complementary pattern can be the same for all aggressor cells or only for subset of aggressor cells.

According to current solutions, a wireless device may read system information by reading a set of channels that include the system information, e.g., MIB followed by SIB1 (e.g., intra-RAT) or MIB followed by SIB1 in turn followed by System Information Block 3 (SIB3) (e.g., for inter-RAT). There are also requirements for system information reading and reporting, e.g., the wireless device should be able to read the system information of a target cell and report the CGI of the target cell within 150 ms, where the CGI is included in the system information of the target cell. The wireless device may also create autonomous gaps for reading the system information of the target cell. When handling aggressor interference, the enhanced receiver of the wireless device needs to also receive the interfering signal. For receiving the interfering signal, gaps may also be needed for wireless devices that are not capable of receiving the victim signal and the aggressor signal at the same time.

FIG. 18 is a flow chart that illustrates the operation of the wireless device 44 to obtain system information of a target cell in a high interference condition using the enhanced receiver according to one embodiment of the present disclosure. As illustrated, the wireless device 44 measures first aggressor interference using one or more gaps in downlink reception and/or uplink transmission for, in this example, the serving cell during a first time period (step 1200). The wireless device 44 mitigates the first aggressor interference during reception of a first victim channel of the victim cell during a second time period (step 1202). In this example, the first victim channel is a channel transmitted by the target cell that includes system information of the victim/target cell. As such, the first victim channel may be read during one or more gaps created in downlink reception and/or uplink transmission for the serving cell. Note, however, that in another embodiment, the victim cell is the serving cell, in which case gap(s) may not be needed to read the system information of the victim cell.

The wireless device 44 then measures second aggressor interference using one or more gaps in downlink reception and/or uplink transmission for the serving cell during a third time period (step 1204). The wireless device 44 then mitigates the second aggressor interference during reception of a second victim channel of the victim cell during a fourth time period (step 1206). Again, in this example, the second victim channel is a channel transmitted by the target cell that includes system information of the victim/target cell. As such, the second victim channel may be read during one or more gaps created in downlink reception and/or uplink transmission for the serving cell. Note, however, that in another embodiment, the victim cell is the serving cell, in which case gap(s) may not be needed to read the system information of the victim cell.

Notably, the victim channels may be different channels or the same channel for the second and fourth time periods. Similarly, the aggressor interference may be interference caused by different channels or the same channel for the first and third time periods. In one example, the two victim channels are PBCH including MIB and PDSCH including SIB1 on the target cell, and the first and second aggressor interference are interference caused by PBCH including MIB and PDSCH including SIB1 of the aggressor cell.

FIG. 19 graphically illustrates one example of the process of FIG. 18. In this example, the first aggressor channel is read/measured during the first time period (Phase 1) and then mitigated during reception of the victim channel during the second time period (Phase 2). The second aggressor channel is read/measured during the third time period (Phase 3) and then mitigated during reception of the victim channel during the fourth time period (Phase 4). In this example, gaps in the reception of the aggressor cell (which may be a serving cell) are used to read the victim channel during the second and fourth time periods (Phase 2 and Phase 4). In this example, the wireless device 44 may need more time to read the system information of the victim/target cell, especially if Phases 1-4 do not overlap. As such, timer T321 may be configured to either provide additional time or to exclude the time periods used for the gaps.

In another embodiment, the time periods (e.g., Phases 1-4), or at least some of the time periods, overlap. For example, the wireless device 44 may start reading the second aggressor channel in Phase 3 before decoding the first victim channel (i.e., before the end of Phase 2). In this embodiment, the wireless device 44 may allocate more memory (internal and/or external) during the overlapping period (e.g., overlapping of Phase 2 and Phase 3). An advantage of this embodiment may be, e.g., less time to complete Phase 4. FIG. 20 illustrates one example of this embodiment in which the second aggressor channel (e.g., PDSCH comprising SIB1) is received in different time resources (e.g., subframes) than the first victim channel (e.g., PBCH). Note that in this example, the wireless device 44 may also configure gaps for the second aggressor channel and/or the first victim channel, since even though they are received during an overlapping period they are still received in different subframes.

In some embodiments, the wireless device 44 may adapt its operation or configuration to meet certain predefined requirements, and a network node (e.g., eNB, positioning node, MDT node, SON node, etc.) may provide its support for simultaneous channel reception or adapt its scheduling or measurement/channel reception configuration to meet certain predefined requirements. The wireless device 44 and/or network node may implement embodiments described above. For example, the wireless device 44 may be required to report measurements (which may also include CGI), report a channel feedback, or respond to/confirm the data received in the (victim and/or aggressor) channel within a certain time and/or with a certain predefined measurement accuracy level.

Some examples of predefined requirements include:
- a wireless device should not use autonomous gaps in subframes indicated for measurements by restricted measurement resource patterns,
- a wireless device should not use autonomous gaps for intra-frequency measurements/channel receptions when provided with assistance data for interference mitigation (e.g., aggressor cell information and/or measurement pattern) via higher layers; in one example, the wireless device may still configure autonomous gaps for inter-frequency measurements/channel receptions,
- a wireless device should not use autonomous gaps for receiving the interfering channel in subframes indicated for measurements by restricted measurement resource patterns,
- a wireless device capable of interference cancellation of one or more physical channels should be capable of receiving, without autonomous gaps, the corresponding physical channel from at least N cells (e.g., N=2), wherein the receiving should be sufficient for performing the interference mitigation from the channel (in one example, the receiving may comprise even channel decoding; in another example, limited receiving as discussed in some of the embodiments above),
- a wireless device using an enhanced receiver should meet a first set of requirements when autonomous gaps are not used and a second set of requirements when autonomous gaps are used,
- a wireless device using an enhanced receiver should meet a first set of requirements when assistance data is provided to facilitate channel reception and a second set of requirements when autonomous gaps may be used,
- a wireless device may use only network-configured gaps in certain subframes,
- a wireless device may use autonomous gaps if the performance degradation which may be caused by using autonomous gaps does not exceed a certain level,
- a wireless device may delay CGI reporting (e.g., postpone the measurement with autonomous gaps or extend the measurement time to acquire CGI) when using an enhanced receiver for interference mitigation,
- a wireless device capable of handling high interference from one or more physical channels may meet a relaxed requirement for a first measurement (e.g., longer measurement time or worse accuracy) when the network requests a second measurement for which using autonomous gaps is allowed, wherein the first and the second measurements may or may not be the same, e.g.:
  - the first measurement is Radio Resource Management (RRM), Radio Link Management (RLM), Channel State Information (CSI), or channel demodulation for which an enhanced receiver is used, and the second measurement is CGI reporting for cell verification, MDT, or SON, and
  - the first measurement is PBCH demodulation in high interference conditions, and the second measurement is a measurement involving receiving the same PBCH.

The requirements may apply in certain conditions or may have different levels in certain conditions (compared to when the conditions are not met), e.g., in one or more of the below:
- interference conditions,
- the signal strength and/or quality of the channel to be received is above a threshold,
- synchronization conditions,
- time alignment conditions,
- Es/Iot of the victim signal/channel, where, as defined in 3GPP TS 36.133:
  - Es is received energy per Resource Element (RE) (power normalized to the subcarrier spacing) during the useful part of the symbol, i.e. excluding the cyclic prefix, at the UE antenna connector, and
  - Iot is the received power spectral density of the total noise and interference for a certain RE (power integrated over the RE and normalized to the subcarrier spacing) as measured at the UE antenna connector,
- Discontinuous Receive (DRX) configured,
- the autonomous gaps are autonomous gaps for intra-frequency measurements/channel reception,
- aggressor information is provided, and
- assistance data is provided, the assistance data comprising the data related to the physical channel to be received.

With regard to different sets of requirements, FIG. 21 is a flow chart that illustrates the operation of the wireless device 44 to operate to comply with different sets of requirements depending on whether the wireless device 44 has enhanced receiver capability according to one embodiment of the present disclosure. As illustrated, the wireless device 44 determines whether it has enhanced receiver capability (step 1300). If not, the wireless device 44 complies with a first set of requirements based on unrestricted use of autonomous gaps (step 1302). However, if the wireless device 44 has enhanced receiver capability, the wireless device 44 complies with a second set of requirements based on restricted use of autonomous gaps using, for example, one of the embodiments described above (step 1304).

The embodiments described herein, e.g., the embodiments related to adapting receiver, scheduling, measurement configuration, and embodiments for meeting a predefined requirement (e.g., as described above) may also be configured in a Test Equipment (TE) node (which is also known as a System Simulator (SS) or test system). The TE or SS will have to implement all configuration methods related to embodiments applicable to different nodes, e.g. wireless device, serving radio node, positioning node, SON node, MDT node, etc., in order to verify predefined requirements and procedures described in preceding sections. The purpose of the test is to verify that the corresponding device/node is compliant to the predefined rules, protocols, signaling, and requirements associated with simultaneous channel reception and/or usage of enhanced receiver.

Typically the TE or SS or test system separately performs tests for the wireless device and the radio network nodes. The testing may be measurement-specific and may be capability-dependent. For example, requirements described above may be verified with such TE or SS. For UE testing, the TE or SS will also be capable of:

receiving the measurement results from a wireless device, and analyzing the received results, e.g. comparing the measurement result or the statistics of the measurement results (e.g., with 90% confidence) obtained in the test with the reference results to determine whether the measuring device is compliant to the requirements or not. The reference can be based on the predefined requirements, UE behavior, or theoretical estimate or performed by a reference device. The reference device can be part of TE or SS.

While not being limited by any particular advantage, some advantages that may be provided by certain implementations of the embodiments disclosed herein are as follows:

In some embodiments, performance of radio measurements and reception of signals and channels in the presence of strong interfering signals is enhanced.

In some embodiments, the enhanced receiver can be utilized more effectively even when the wireless device 44 cannot simultaneously decode or receive interfering signal from neighbor cell(s) and desired signal from serving/measured cell.

In some embodiments, means for the network to configure the enhanced receiver capable wireless device 44 regarding when the wireless device 44 should create autonomous gaps for the purpose of using enhanced receiver for mitigating interference from neighboring cells are provided. This in turn enables the network to optimally control the serving cell performance, e.g. avoid or minimize serving cell signal reception at the wireless device 44.

Although the described embodiments may be implemented in any appropriate type of telecommunications system supporting any suitable communication standards and using any suitable components, particular embodiments of the described solutions may be implemented in an LTE cellular communications network, such as the example network shown in FIG. 5 above. Although the wireless device 44 in the example network may represent communication devices that include any suitable combination of hardware and/or software, the wireless device 44 may, in particular embodiments, represent a device such as the one illustrated in greater detail in FIG. 22. Similarly, although the illustrated radio network nodes may represent network nodes that include any suitable combination of hardware and/or software, these network nodes may, in particular embodiments, represent devices such as the example macro base station 36 illustrated in greater detail in FIG. 23 and the example low-power base station 40 illustrated in greater detail in FIG. 24, respectively.

As shown in FIG. 22, the example wireless device 44 includes a processor 46, a memory 48, a transceiver 50, and one or more antennas 52. In particular embodiments, some or all of the functionality described above as being provided by the wireless device 44 may be provided by the processor 46 executing instructions stored on a computer-readable medium, such as the memory 48 shown in FIG. 22. Alternative embodiments of the wireless device 44 may include additional components beyond those shown in FIG. 22 that may be responsible for providing certain aspects of the device's functionality, including any of the functionality described above and/or any functionality necessary to support the embodiments described above.

As shown in FIG. 23, the example macro base station 36 includes a baseband unit 54 including a processor 56, a memory 58, and a network interface 60 and a radio unit 62 including a transceiver 64 connected to one or more antennas 66. In particular embodiments, some or all of the functionality described above as being provided by the macro base station 36 or macro cell 38 may be provided by the processor 56 executing instructions stored on a computer-readable medium, such as the memory 58 shown in FIG. 23. Alternative embodiments of the macro base station 36 may include additional components responsible for providing additional functionality, including any of the functionality identified above and/or any functionality necessary to support the embodiments described above.

As shown in FIG. 24, the example low-power base station 40 includes a baseband unit 68 including a processor 70, a memory 72, and a network interface 74 and a radio unit 76 including a transceiver 78 connected to one or more antennas 80. In particular embodiments, some or all of the functionality described above as being provided by the low-power base station 40 (e.g., a pico base station, a femto base station, a micro base station, a home eNB, a relay, a RRH, an access point, and/or any other type of radio network node) may be provided by the processor 70 executing instructions stored on a computer-readable medium, such as the memory 72 shown in FIG. 24. Alternative embodiments of the low-power base station 40 may include additional components responsible for providing additional functionality, including any of the functionality identified above and/or any functionality necessary to support the embodiments described above.

The attached Appendix provides a non-limiting example of how certain aspects of the disclosed embodiments could be implemented within the framework of a specific communication standard. Specifically, the Appendix shows changes that could be made to the 3GPP specification 3GPP TS 36.133 "Evolved Universal Terrestrial Radio Access (E-UTRA); Requirements for support of radio resource management," V11.3.0, December 2012 (the "3GPP Specification"), which is incorporated herein by reference in its entirety, for purposes of implementing certain embodiments of the present disclosure.

The changes described by the Appendix are merely intended to illustrate how certain aspects of the disclosed embodiments could be implemented in a particular standard. However, the disclosed embodiments could also be implemented in other suitable manners, both in the 3GPP Specification and in other specifications or standards.

The following acronyms are used throughout this disclosure.

3GPP Third Generation Partnership Project
ABS Almost Blank Subframe
ACK Acknowledgement
ANR Automatic Neighbor Relation
ARQ Automatic Repeat Request
BCH Broadcast Channel
BCCH Broadcast Control Channel
CA Carrier Aggregation
CDMA Code Division Multiple Access
CGI Cell Global Identification
CRE Cell Range Expansion
CRS Cell-Specific Reference Signal
CSG Closed Subscriber Group
CSI Channel State Information DCI Downlink Control Information
DL Downlink
DL-SCH Downlink Shared Channel
DRX Discontinuous Receive
DVR Digital Video Recorder
eICIC Enhanced Inter-Cell Interference Coordination
eNB Evolved Node B
E-UTRAN Evolved Universal Terrestrial Radio Access Network
FDD Frequency Division Duplexing
GERAN Global System for Mobile Communications EDGE Radio Access Network
GSM Global System for Mobile Communications
HRPD High Rate Packet Data
HSDPA High Speed Downlink Packet Access
HSPA High Speed Packet Access
IC Interference Cancellation
ID Identifier
LMU Location Measurement Unit
LTE Long Term Evolution
LTE Rel-10 Long Term Evolution Release 10
LTE Rel-11 Long Term Evolution Release 11
M2M Machine-to-Machine
MBSFN Multimedia Broadcast Single Frequency Network
MCS Modulation and Coding Scheme
MDT Minimization of Drive Tests
MIB Master Information Block
MME Mobility Management Entity
MMSE-IRC Minimum Mean Square Error—Interference Rejection Combining
MMSE-SIC Minimum Mean Square Error—Successive Interference Cancellation
ms Microsecond
MSR Multiple Standard Radio
MTC Machine Type Communication
NACK Negative Acknowledgement
O&M Operations and Management
OSS Operations Support System
PBCH Physical Broadcast Channel
PCell Primary Cell
PCFICH Physical Control Format Indicator Channel
PCI Physical Cell Identity
PDA Personal Digital Assistant
PDCCH Physical Downlink Control Channel
PDN Packet Data Network
PDSCH Physical Downlink Shared Channel
P-GW Packet Data Network Gateway
PHICH Physical Hybrid Automatic Repeat Request Indicator Channel
PLMN Public Land Mobile Network
PRS Positioning Reference Signal
PSAP Public Safety Answering Point
PSS Primary Synchronization Signal
RAN Radio Access Network
RAT Radio Access Technology
RBS Radio Base Station
RFID Radio Frequency Identifier
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSTD Reference Signal Time Difference
RV Redundancy Version
Rx Receive
SCell Secondary Cell
SFN System Frame Number
S-GW Serving Gateway
SI System Information
SIB System Information Block
SIB1 System Information Block 1
SIB3 System Information Block 3
SINR Signal-to-Interference-Plus-Noise Ratio
SON Self Organizing Network
SRS Sounding Reference Signal
SS System Simulator
SSS Secondary Synchronization Signal
TDD Time Division Duplexing
TE Test Equipment
TS Technical Specification
Tx Transmit
UE User Equipment
UL Uplink
UMTS Universal Mobile Telecommunications System
UTRAN Universal Terrestrial Radio Access Network Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless device having enhanced receiver capability in a cellular communications network, comprising:
    measuring interference from a first cell during one or more gaps created for a second cell to obtain one or more interference measurements, the one or more gaps being one or more gaps in at least one of a group consisting of: downlink reception from the second cell and uplink transmission to the second cell; and
    mitigating the interference during reception of a signal from a cell other than the first cell based on the one or more interference measurements using the enhanced receiver capability of the wireless device.

2. The method of claim 1 wherein the cell other than the first cell is the second cell.

3. The method of claim 2 wherein:
    the interference from the first cell comprises interference generated by transmission of an interfering channel from the first cell; and
    mitigating the interference comprises mitigating the interference during reception of a same channel type as the interfering channel from the second cell based on the one or more interference measurements using the enhanced receiver capability of the wireless device.

4. The method of claim 2 wherein a total time for performing reception of the signal from the second cell is extended to account for the one or more gaps.

5. The method of claim 2 wherein a total time for performing reception of the signal from the second cell excludes the one or more gaps.

6. The method of claim 2 wherein:
    measuring the interference comprises measuring the interference from the first cell during the one or more gaps created for the second cell during a first time period; and
    mitigating the interference comprises mitigating the interference during reception of a signal from the second cell during a second time period that occurs after the first time period and does not overlap the first time period.

7. The method of claim 2 wherein:
measuring the interference comprises measuring the interference from the first cell during the one or more gaps created for the second cell during a first time period; and
mitigating the interference comprises mitigating the interference during reception of a signal from the second cell during a second time period that overlaps a portion of the first time period.

8. The method of claim 2 further comprising:
autonomously creating the one or more gaps by the wireless device.

9. The method of claim 2 wherein creating the one or more gaps comprises:
receiving gap configuration information from a network node of the cellular communications network; and
creating the one or more gaps based on the gap configuration information.

10. The method of claim 9 wherein the gap configuration information comprises information that is indicative of a time domain pattern for interference measurements.

11. The method of claim 2 wherein the interference from the first cell is generated by at least a channel transmitted by the first cell.

12. The method of claim 2 wherein the interference from the first cell is generated by at least a channel transmitted by the first cell that includes system information for the first cell.

13. The method of claim 1 wherein:
measuring the interference from the first cell comprises measuring interference generated by transmission of a first interfering channel by the first cell during one or more gaps created for the second cell during a first time period to obtain a first interference measurement, the one or more gaps created for the second cell during the first time period being one or more gaps created in at least one group consisting of: downlink reception from the second cell and uplink transmission to the second cell; and
mitigating the interference comprises mitigating the interference generated by transmission of the first interfering channel during reception of a first victim channel from the cell other than the first cell during a second time period based on the first interference measurement;
wherein the method further comprises:
measuring interference generated by transmission of a second interfering channel by the first cell during one or more gaps created for the second cell during a third time period to obtain a second interference measurement, the one or more gaps created for the second cell during the third time period being one or more gaps created in at least one of a group consisting of: downlink reception from the second cell and uplink transmission to the second cell; and
mitigating the interference generated by transmission of the second interfering channel during reception of a second victim channel from the cell other than the first cell during a fourth time period based on the second interference measurement.

14. The method of claim 13 wherein the first, second, third, and fourth time periods are non-overlapping.

15. The method of claim 13 wherein at least two of the first, second, third, and fourth time periods partially overlap.

16. The method of claim 1, wherein the enhanced receiver capability comprises mitigating or cancelling at least interference caused by one or more of the following channels transmitted by the first cell: Physical Broadcast Channel, PBCH, Physical Downlink Shared Channel, PDSCH, Physical Downlink Control Channel, PDCCH, Physical Control Format Indicator Channel, PCFICH, or Physical Hybrid Automatic Repeat Request Indicator Channel, PHICH.

17. A wireless device having enhanced receiver capability for operation in a cellular communications network, comprising:
a transceiver; and
a processor associated with the transceiver configured to:
measure interference from a first cell during one or more gaps created for a second cell to obtain one or more interference measurements, the one or more gaps created for the second cell being one or more gaps created in at least one group consisting of: downlink reception from the second cell and uplink transmission to the second cell; and
mitigate the interference during reception of a signal from a cell other than the first cell based on the one or more interference measurements using an enhanced receiver capability of the wireless device.

* * * * *